United States Patent
Xu et al.

(10) Patent No.: US 11,088,389 B2
(45) Date of Patent: Aug. 10, 2021

(54) NANOSCALE PORE STRUCTURE CATHODE FOR HIGH POWER APPLICATIONS AND MATERIAL SYNTHESIS METHODS

(71) Applicant: A123 SYSTEMS LLC, Waltham, MA (US)

(72) Inventors: Chuanjing Xu, Ann Arbor, MI (US); Maha Hammoud, Westland, MI (US); Judith M. Laforest, Chelsea, MI (US); Hyojin Lee, Canton, MI (US); Derek Johnson, Fort Collins, CO (US)

(73) Assignee: A123 SYSTEMS LLC, Waltham, MA (US)

( * ) Notice: Subject to any disclaimer, the term of this patent is extended or adjusted under 35 U.S.C. 154(b) by 60 days.

(21) Appl. No.: 15/739,665

(22) PCT Filed: Jun. 8, 2016

(86) PCT No.: PCT/US2016/036473
§ 371 (c)(1),
(2) Date: Dec. 22, 2017

(87) PCT Pub. No.: WO2016/209626
PCT Pub. Date: Dec. 29, 2016

(65) Prior Publication Data
US 2018/0183089 A1    Jun. 28, 2018

Related U.S. Application Data

(60) Provisional application No. 62/294,888, filed on Feb. 12, 2016, provisional application No. 62/185,457, filed on Jun. 26, 2015.

(51) Int. Cl.
*H01M 10/052*    (2010.01)
*H01M 4/136*    (2010.01)
(Continued)

(52) U.S. Cl.
CPC .......... *H01M 10/052* (2013.01); *C01B 25/45* (2013.01); *H01M 4/136* (2013.01); *H01M 4/5825* (2013.01); *Y02T 10/70* (2013.01)

(58) Field of Classification Search
None
See application file for complete search history.

(56) References Cited

U.S. PATENT DOCUMENTS 7,842,420 B2    11/2010    Wixom et al.
9,660,267 B2    5/2017    Beck et al.
(Continued)

FOREIGN PATENT DOCUMENTS

CN    103864045 A    6/2014
CN    103872324 A    6/2014
(Continued)

OTHER PUBLICATIONS

ISA Korean Intellectual Property Office, International Search Report and Written Opinion Issued in Application No. PCT/US2016/036473, dated Sep. 12, 2016, WIPO, 21 pages.
(Continued)

*Primary Examiner* — Zhongqing Wei
(74) *Attorney, Agent, or Firm* — McCoy Russell LLP

(57) ABSTRACT

A lithium iron phosphate electrochemically active material for use in an electrode and methods and systems related thereto are disclosed. In one example, a lithium iron phosphate electrochemically active material for use in an electrode is provided including, a dopant comprising vanadium and optionally a co-dopant comprising cobalt.

15 Claims, 19 Drawing Sheets

(51) Int. Cl.
*H01M 4/58* (2010.01)
*C01B 25/45* (2006.01)

(56) References Cited

U.S. PATENT DOCUMENTS

| | | | |
|---|---|---|---|
| 10,421,664 B2* | 9/2019 | Kang | C01F 7/002 |
| 2004/0126300 A1 | 7/2004 | Barker et al. | |
| 2008/0305256 A1 | 12/2008 | Kimble et al. | |
| 2011/0052988 A1 | 3/2011 | Beck et al. | |
| 2012/0199784 A1 | 8/2012 | Wixom et al. | |
| 2012/0273716 A1* | 11/2012 | Li | H01M 4/02 |
| | | | 252/182.1 |
| 2013/0316240 A1 | 11/2013 | Song et al. | |
| 2015/0180022 A1 | 6/2015 | Beck et al. | |
| 2015/0311510 A1* | 10/2015 | Yoshida | H01M 4/366 |
| | | | 429/221 |

FOREIGN PATENT DOCUMENTS

| | | | |
|---|---|---|---|
| JP | 2009508302 A | 2/2009 | |
| JP | 2009518262 A | 5/2009 | |
| JP | 2013098104 A | 5/2013 | |
| JP | 2014524133 A | 9/2014 | |
| KR | 20020025819 A | 4/2002 | |
| WO | 2007030816 A2 | 3/2007 | |
| WO | 2012043367 A1 | 4/2012 | |
| WO | 2013016426 A1 | 1/2013 | |
| WO | WO-2015080302 A1 * | 6/2015 | C01D 15/02 |

OTHER PUBLICATIONS

Zhao, T. et al., "Local structure of vanadium in doped LiFePO4," Journal of Synchrotron Radiation, vol. 17, No. 5, Sep. 2010, Available Online Aug. 7, 2010, 6 pages.

Zhang, L. et al., "Effect of Vanadium Incorporation on Electrochemical Performance of LiFePO4 for Lithium-Ion Batteries," The Journal of Physical Chemistry, vol. 115, No. 27, Jun. 8, 2011, 8 pages.

Sun, P. et al., "Preparation of V-Doped LiFePO4/C as the Optimized Cathode Material for Lithium Ion Batteries," Journal of Nanoscience and Nanotechnology, vol. 15, No. 4, Apr. 2015, 6 pages.

European Patent Office, Partial Supplementary European Search Report Issued in Application No. 16815037.3, Mar. 7, 2019, Germany, 18 pages.

Barker, J. et al., "Electrochemical Insertion Properties of the Novel Lithium Vanadium Fluorophosphate, LiVPO4F," Journal of the Electrochemical Society, vol. 150, No. 10, Sep. 4, 2003, 5 pages.

Plashnitsa, L. et al., "Symmetric lithium-ion cell based on lithium vanadium fluorophosphate with ionic liquid electrolyte," Electrochimica Acta, vol. 56, No. 3, Jan. 1, 2011, Available Online Nov. 17, 2010, 8 pages.

European Patent Office, Extended European Search Report Issued in Application No. 16815037.3, dated Jul. 4, 2019, Germany, 19 pages.

Japan Patent Office, Office Action Issued in Application No. 2019-101212, dated May 26, 2020, 4 pages.

* cited by examiner

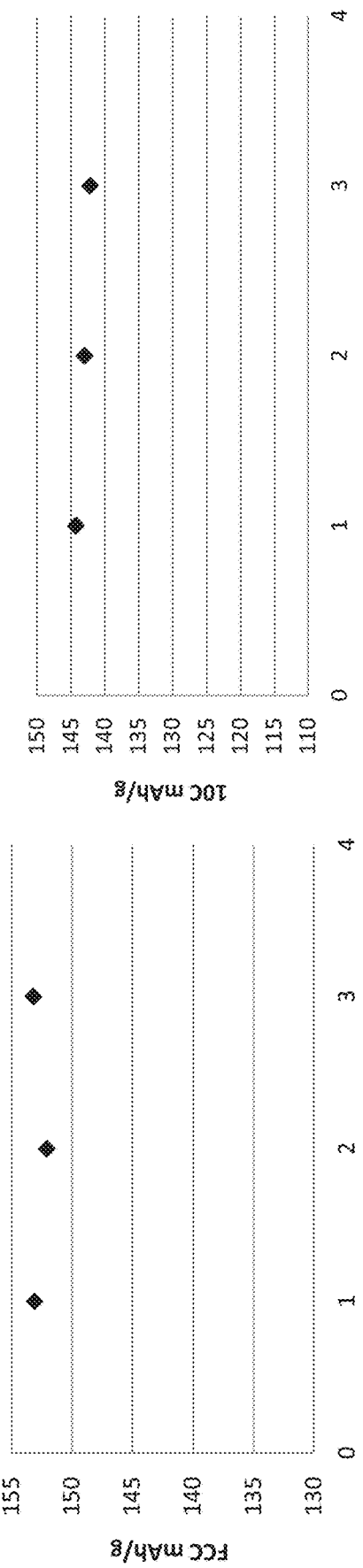
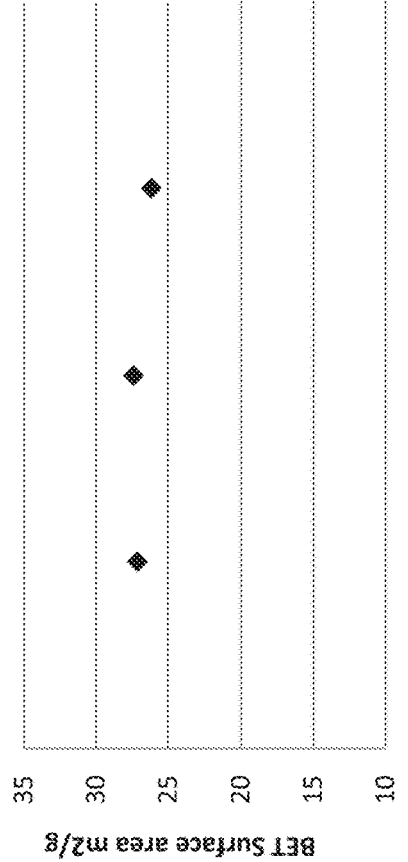
FIG. 15A
FIG. 15B
FIG. 15C

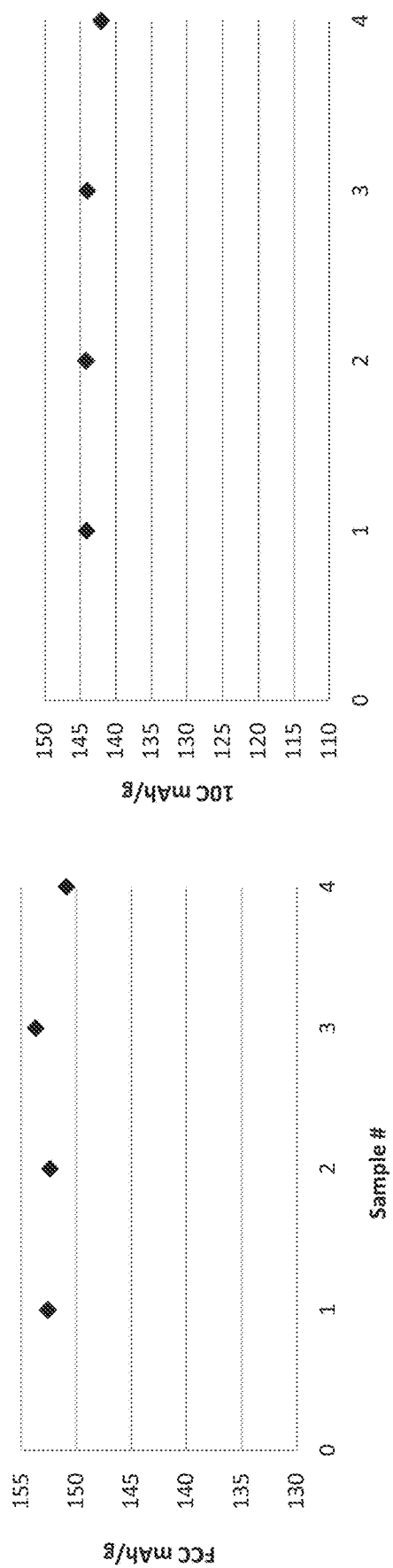
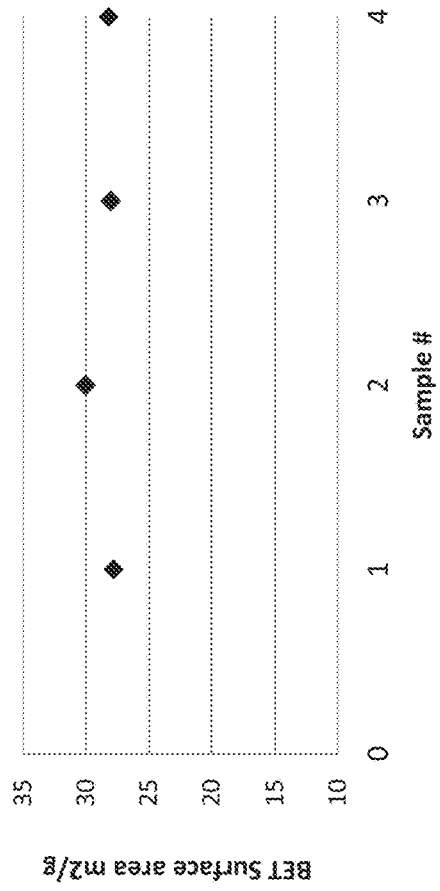
FIG. 16A
FIG. 16B
FIG. 16C

NANOSCALE PORE STRUCTURE CATHODE FOR HIGH POWER APPLICATIONS AND MATERIAL SYNTHESIS METHODS

CROSS-REFERENCE TO RELATED APPLICATION

The present application is a U.S. National Phase of International Application No. PCT/US2016/036473 for "NANOSCALE PORE STRUCTURE CATHODE FOR HIGH POWER APPLICATIONS AND MATERIAL SYNTHESIS METHODS", filed on Jun. 8, 2016. International Application No. PCT/US2016/036473 claims priority from U.S. Provisional Application Ser. No. 62/185,457 for "HIGH POWER CATHODE MATERIAL SYNTHESIS AND ASSOCIATED METHODS FOR ELECTROCHEMICAL ENERGY STORAGE DEVICES", filed on Jun. 26, 2015, and U.S. Provisional Application Ser. No. 62/294,888 for "NANOSCALE PORE STRUCTURE CATHODE FOR HIGH POWER APPLICATIONS AND MATERIAL SYNTHESIS METHODS", filed Feb. 12, 2016. The entire contents of each of the above-referenced applications are incorporated herein by reference for all purposes.

FIELD

This application relates to materials and methods for battery electrodes, materials used therein, and electrochemical cells using such electrodes and methods of manufacture, such as lithium ion batteries.

BACKGROUND AND SUMMARY

Lithium-ion (Li-ion) batteries are a type of rechargeable battery which produces energy from electrochemical reactions. In a typical lithium ion battery, the cell may include a positive electrode, a negative electrode, an ionic electrolyte solution that supports the movement of ions back and forth between the two electrodes, and a porous separator which allows ion movement between the electrodes and ensures that the two electrodes are electrically isolated.

Li-ion batteries' success in the consumer electronics market has resulted in their use in the transportation industry for hybrid electric vehicles (HEVs), plug-in hybrid electric vehicles (PHEVs), and electric vehicles (EVs). While rechargeable lithium-ion batteries have found multiple applications in portable electronics, high charge and discharge rates are secondary design considerations. However, when considering the use of rechargeable lithium-ion batteries in the transportation industry, the ability to sustain high charge and discharge rates becomes important. Transportation industry applications, as well as the ever increasing demand for more powerful portable electronic devices, has prompted the need for batteries that can consistently maintain large charge and discharge current densities. Thus, electrode materials having irregular surfaces resulting in high interfacial surface areas and short characteristic diffusion lengths, either through a porous structure or nanoscale primary particle size, are expected to provide lithium-ion batteries with high power densities. Safety is also becoming an important factor in the design of new Li-ion batteries, especially for transportation applications.

To address the safety concern associated with oxide based cathode materials, lithium iron phosphate (LFP) is considered a good replacement candidate as it is thermodynamically stable and does not release oxygen upon decomposition. This is especially true for low voltage starter, start-stop, and mild-hybrid battery applications. When considering LFP as the cathode material, the characteristics in terms of morphology, chemical composition, and particle size may be carefully controlled. Because different LFP precursor materials and different synthesis routes are employed by material suppliers, special attention may first be given to impurities and ensuring the correct composition. The incorrect composition and impurities can have a detrimental impact on LFP performance and thus the lithium-ion battery as a whole. Secondly, the various synthesis methods utilized by material suppliers can result in non-ideal primary and secondary particle sizes, an average surface area that is too low, and a particle morphology that can limit the rate performance of the cathode. An LFP with carefully controlled electrochemical and physical characteristics is therefore needed to provide consistent results when incorporated into lithium-ion batteries.

One example of an LFP material to be used as a high power electrode material was disclosed by Beck et al in U.S. patent application Ser. No. 14/641,172. For example, in U.S. patent application Ser. No. 14/641,172, the active electrode material includes LFP synthesized from a spheniscidite $FePO_4$ ($NH_4Fe_2(PO_4)_2OH.2H_2O$) precursor, herein also referred to as spheniscidite $FePO_4$-LFP. Utilizing spheniscidite $FePO_4$ as the iron phosphate ($FePO_4$) precursor material resulted in specific particle morphology with high surface area and enhanced surface features. These properties resulted in an active electrode material with exceptionally high power, especially at temperatures at 0° C. and below, when compared to other LFP-active electrode materials at low temperatures. This spheniscidite $FePO_4$-LFP demonstrated improved cold crank performance for low voltage starter, start-stop, and mild-hybrid battery applications. The LFP synthesized from a spheniscidite $FePO_4$ precursor, including the above, discussed properties as disclosed in U.S. patent application Ser. No. 14/641,172, entitled "High Power Electrode Materials," filed Mar. 6, 2015, the entire contents of which are hereby incorporated by reference for all purposes.

The inventors herein have recognized that there are three key reasons for further development of the technology described in U.S. patent application Ser. No. 14/641,172 titled "High Power Electrode Materials": (1) to increase the first charge capacity (FCC); (2) to eliminate use of vanadium in the plus five (+5) oxidation state; and (3) mitigate ammonia ($NH_3$) emission during the precursor preparation and calcination processes.

Low FCC, when compared to the theoretical capacity of the active material, reduces the energy density of the lithium-ion battery. Therefore, an increase in the FCC when compared to current LFP materials, for example the LFP synthesized from spheniscidite $FePO_4$, would improve the overall energy density of the cell without negatively impacting the power performance.

Trivalent vanadium is considerably more benign than pentavalent vanadium. Replacing the pentavalent vanadium as described in U.S. patent application Ser. No. 14/641,172 with a non-obvious trivalent vanadium precursor promotes an FCC increase and $NH_3$ emission decrease, while maintaining the rate and low temperature power performance of the LFP. It is additionally necessary to use pollution control systems when manufacturing a product that results in a measurable release of $NH_3$. These pollution control systems result in an added manufacturing cost. The increased cost coupled with the commitment to enhance the environmentally friendliness of our manufacturing processes, provide significant drivers to eliminate, or significantly reduce, the $NH_3$ emission associated LFP production as described in U.S. patent application Ser. No. 14/641,172. As described herein, the inventors have recognized replacement of spheniscidite $FePO_4$, which is most likely the main precursor contributing to the $NH_3$ emissions, with a non-obvious iron phosphate precursor that results in an FCC increase while maintaining the rate and low temperature power performance of the LFP is desirable both from an economic and safety perspective.

An additional area of development that is a focus of the teachings contained herein is to mitigate the moisture uptake of the final LFP both in powder form and when incorporated into an electrode of an electrochemical energy storage device. Engineering a particle pore structure that can maintain high surface areas, maintain parity in terms of the cumulative pore volume when compared to the prior art, while simultaneously shifting the majority of the pores to a diameter on the nanometer scale, can mitigate performance and manufacturing challenges that have been attributed to elevated levels of moisture in the lithium-ion cell. Elevated levels of moisture uptake in an active material can impact lithium-ion battery cell manufacturing as the electrodes that contain the active material with the high levels of moisture may be thermally treated to remove the moisture, kept in a dry environment, and then thermally treated again once incorporated into the electrochemical energy storage device before the liquid electrolyte is added. The described process requiring multiple thermal treatments adds time and cost to the manufacturing process.

If the moisture from the active material is not effectively removed from the energy storage device, the moisture can diffuse through the liquid electrolyte until in contact with the negative electrode. Once in contact with the negative electrode, the moisture can be electrochemically reduced thereby forming a gas. Gas formation within the cell is not ideal as it causes a pressure increase that can be a detriment to the longevity of the energy storage device. Moisture, once introduced into the device, has been demonstrated to react with certain lithium-ion salts utilized in lithium-ion battery electrolytes. This reaction results in the formation of corrosive species that degrade the performance of the device components leading to decreased device function and reduced lifetime. In addition, the corrosive species that could be formed by the above demonstration, may contribute to the formation of an electrochemically inactive Li- species. The formation of this inactive species accelerates the reduction of the energy storage capacity of the device and thus detrimentally impacts the device life.

To that end, the inventors herein disclose methods and materials in general including identifying zero $NH_3$ emission, or low $NH_3$ emission, formulation(s) of LFP utilizing synthesis methods that provide an improved FCC, maintain high rate capability (defined as a 10 C discharge capacity of greater than 140 mAh/g at 23° C.), and ensure the low temperature performance (defined as a direct current resistance (DCR) of less than 10 ohm when measured for 20 mAh double layer pouch (DLP) cell at −20° C.). As another non-limiting example, the DCR value may be less than 9 ohm. In another non-limiting example, the low temperature performance may be less than 8.5 ohm.

The inventors herein have also recognized materials and methods that further improve the FCC and rate capability, as well as reduce moisture uptake (thus resulting in a reduction in gas formation during the life of the lithium-ion battery) while maintaining low or no $NH_3$ emission. In one example, an LFP electrochemically active material for use in an electrode comprising a phosphate to iron molar ratio of 1.000-1.050:1, a dopant comprising vanadium in a trivalent state and optionally a co-dopant comprising cobalt, and a total non-lithium metal to phosphate molar ratio of 1.000-1.040:1 is provided. As another example, an LFP electrochemically active material may be provided which may comprise a phosphate to iron molar ratio of 1.020-1.040:1 and a dopant comprising vanadium in a trivalent state, wherein optionally comprising a cobalt co-dopant and comprising a total non-lithium metal to phosphate molar ratio of 1.001-1.020:1. Still, a further example LFP electrochemically active material may comprise a phosphate to iron molar ratio of 1.0300-1.0375:1, a dopant comprising vanadium in a trivalent state, optionally comprising a cobalt co-dopant, and a total non-lithium metal to phosphate molar ratio of 1.0025-1.0050:1.

As a specific example, an LFP electrochemically active material synthesized from an iron phosphate precursor with an iron weight percent in the range of 28-37 wt. %, and 0-5 dopants wherein one dopant may be vanadium which may be present in the LFP formula within the range of 0.0-5.0 Mol. % and one dopant may be cobalt which may be present in the LFP formula within the range of 0.0-1.0 Mol. %. As another non-limiting example, an LFP material synthesized from an iron phosphate precursor with an iron weight percent in a range of 35-37 wt. % and 1-2 dopants wherein one dopant may be vanadium which may be present in the LFP formula in a range of 2.0-4.0 Mol. % and one dopant may be cobalt which may be present in the LFP formula in a range from 0.0-0.5 Mol. %. Still a further example of an LFP electrochemically active material may be synthesized from an iron phosphate precursor with an iron weight percent in a range between 36.0 and 37.0 wt. %.

A method to form an LFP electrochemically active material for use in an electrode, comprises mixing a vanadium dopant in a trivalent state, a lithium source, a carbon source, an iron phosphate source with an iron content of at least 28 wt. % and a phosphate to iron molar ratio of 1.000-1.040:1, and optionally a co-dopant, adding a solvent to form a slurry, milling the slurry, drying the milled slurry to form an LFP precursor powder, firing the dried powder to obtain the LFP electrochemically active material, wherein the LFP comprises the vanadium dopant and/or co-dopant partially substituting Fe in a crystal lattice structure, a phosphate to iron molar ratio of 1.000-1.050:1, and a total non-lithium metal to phosphate molar ratio of 1.000-1.040:1.

Further, the final LFP powder may have a surface area greater than about 25 $m^2/g$ within the range of 25-35 $m^2/g$ for example. Further, as a non-limiting example, the final LFP powder may have, a tap density within a range of 1.0-1.5 g/mL, and an FCC of greater than 145 mAh/g and a 10 C discharge capacity of greater than 135 mAh/g.

As another example, the final LFP powder may comprise a surface area in the range of 28-32 $m^2/g$, a tap density within the range of 1.10-1.40 g/mL, an FCC of greater than 150 mAh/g, and a 10 C discharge capacity of greater than 138 mAh/g. A further example of the final LFP powder may comprise a surface area in the range of 29-31 $m^2/g$, a tap density in the range of 1.20-1.30 g/mL, an FCC greater than 152 mAh/g, and a 10 C discharge capacity of greater than 140 mAh/g.

The general purpose of the present teachings described herein relates to the physical structure of materials, methods to synthesize those materials, methods to identify successful process of said materials, and the use of those materials in an electrochemical energy storage device. The teachings presented herein are most directly applicable to lithium-ion based electrochemical energy storage devices, but not limited to such a device if practiced by one skilled in the art. A lithium-ion based electrochemical energy storage device may utilize two electrodes, an electrolyte solution, and a porous, electrically insulating separator containing said electrolyte that is placed between the electrodes. When constructed in the above described manner, these energy storage devices can reversibly store energy through reduction and oxidation reactions that occur in the active materials incorporated into the electrodes. The previous discussion regarding the active components chemical composition, electrolyte, overall reactions when energy is being stored or released, and the mechanism for which charged species are transported within the device is applicable to these teachings as well.

As provided herein, systems and methods for sustaining large charge and discharge currents while minimizing the cell capacity are disclosed, especially with the use of lithium-ion battery technology for low voltage transportation applications. The requirement has prompted the need for batteries that can consistently maintain large charge and discharge current densities while maintaining a high level of safety.

The disclosed embodiments may include manipulating the primary and secondary particles pore structure such that the total pore volume reaches parity with the teachings described in U.S. patent application Ser. No. 14/641,172 and further shifting the pore size distribution such that a large percentage of the pores are in the sub 10-nm range. The result of holding the total pore volume constant while shifting the pore size to smaller diameters reduces the overall moisture uptake. Another embodiment discloses optimal unexpected dopant levels as well as the speciation of the dopants which are effectively incorporated into the LFP crystal structure as measured by an increase in the rate performance along a wide temperature range. An additional embodiment of this present disclosure includes the production and thermal response of the LFP precursor powder ensuring a final LFP product with the needed physical and electrochemical attributes to function as a high rate cathode for lithium-ion batteries.

It will be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 15A, B, and C are plots measuring FCC, 10 C discharge capacity and surface area of a $FePO_4$-LFP formulation with a secondary impurity phase.

FIGS. 16A, B, and C are plots measuring FCC, 10 C discharge capacity and surface area of a PP $FePO_4$-LFP formulation.

DETAILED DESCRIPTION

The present disclosure will now be described more fully hereinafter with reference to the accompanying drawings, in which exemplary embodiments of the invention are shown. The particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways.

Components, process steps, and other elements that may be substantially the same in one or more embodiments are identified coordinately and are described with minimal repetition. It will be noted, however, that elements identified coordinately may also differ to some degree.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" or "a mixture of" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
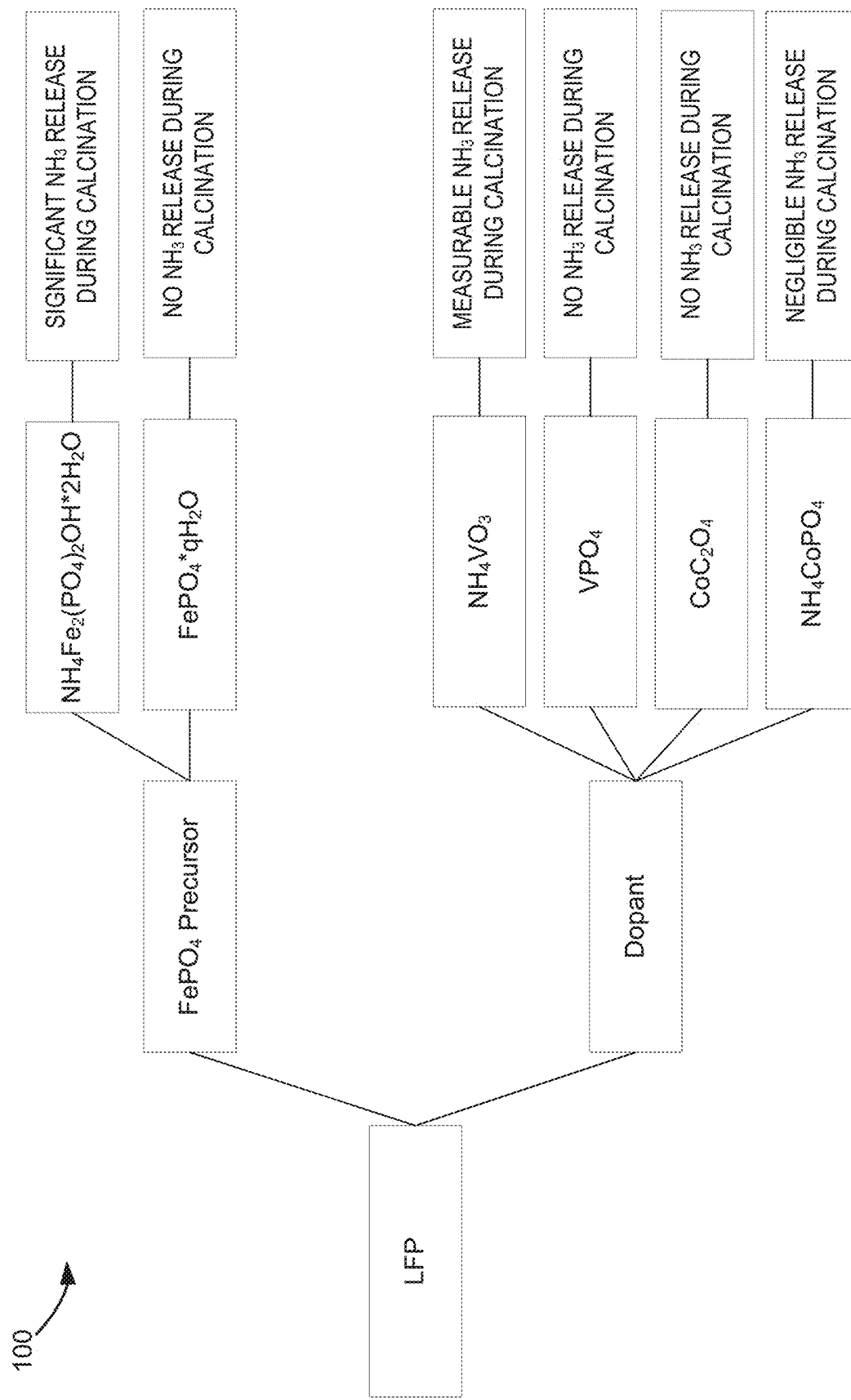
FIG. 1 is an illustration of iron phosphate precursors and dopant precursors and their contribution to $NH_3$ emission during LFP synthesis.
Figure 2:
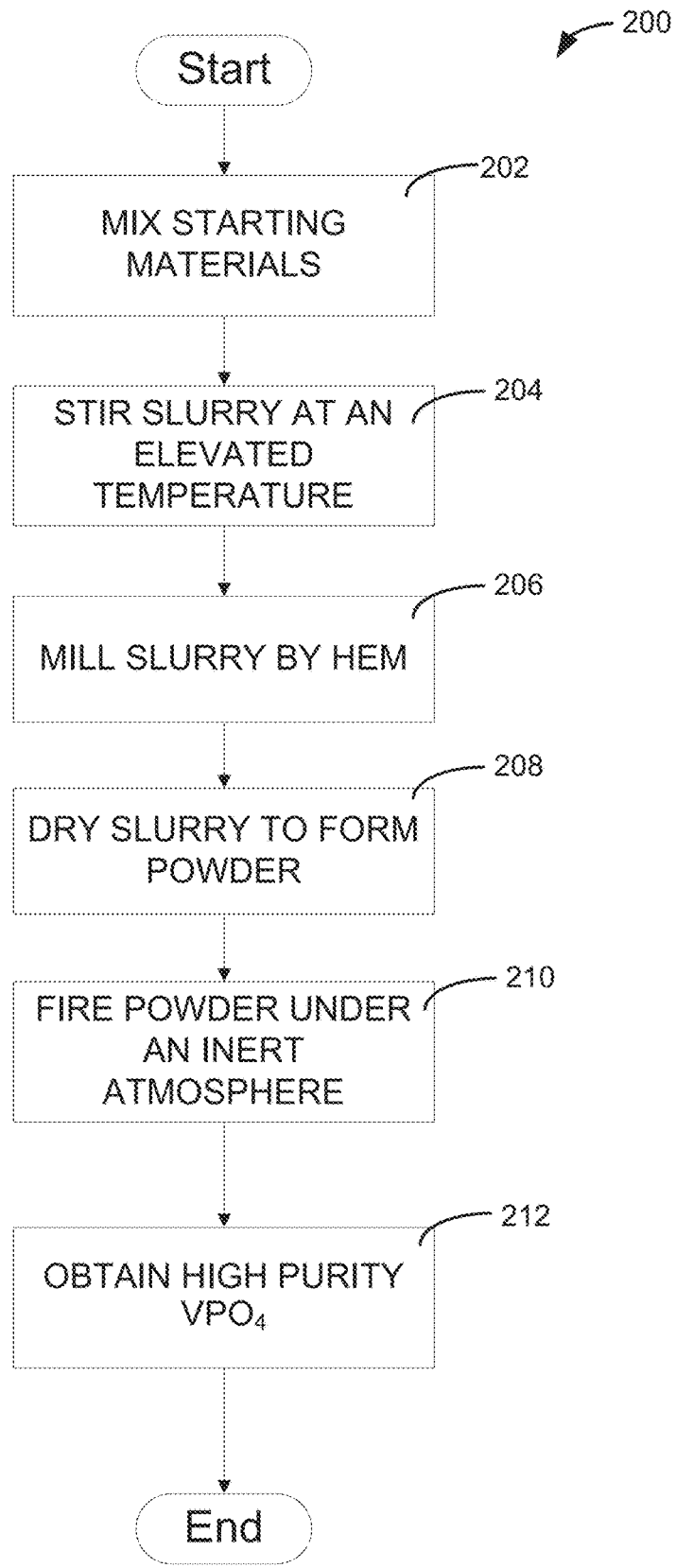
FIG. 2 is an illustration of vanadium phosphate synthesis steps.
Figure 3:
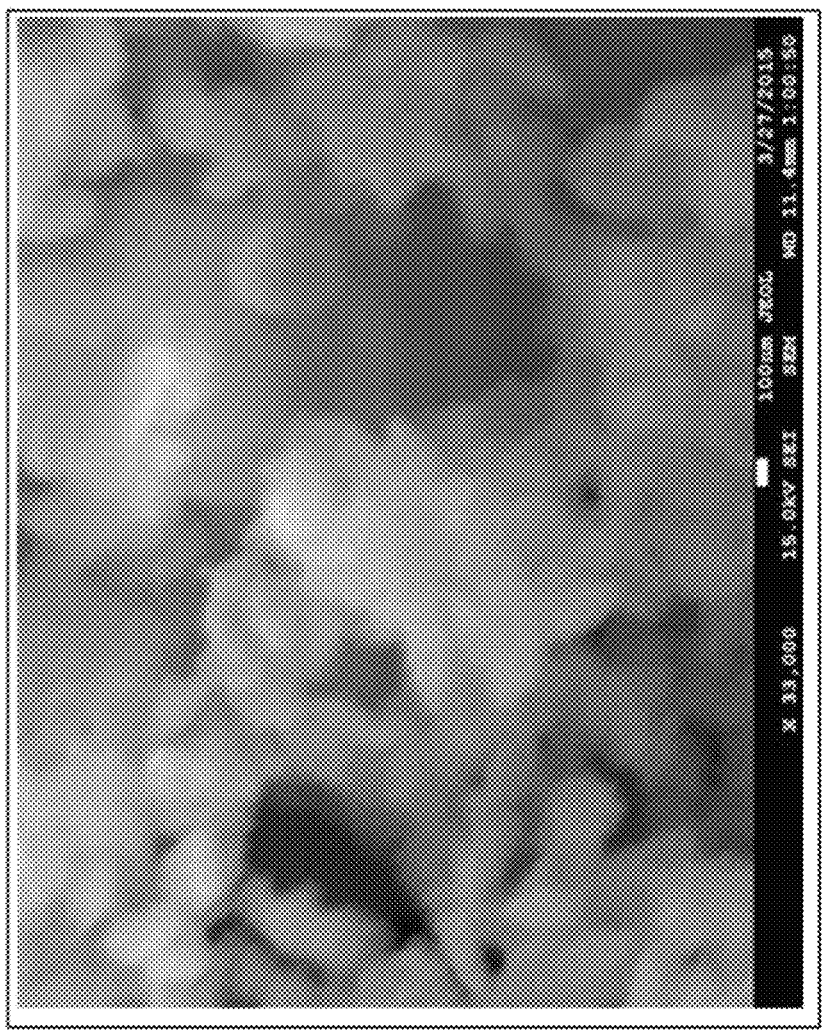
FIG. 3 is a high magnification SEM image of spheniscidite $FePO_4$.
Figure 4:
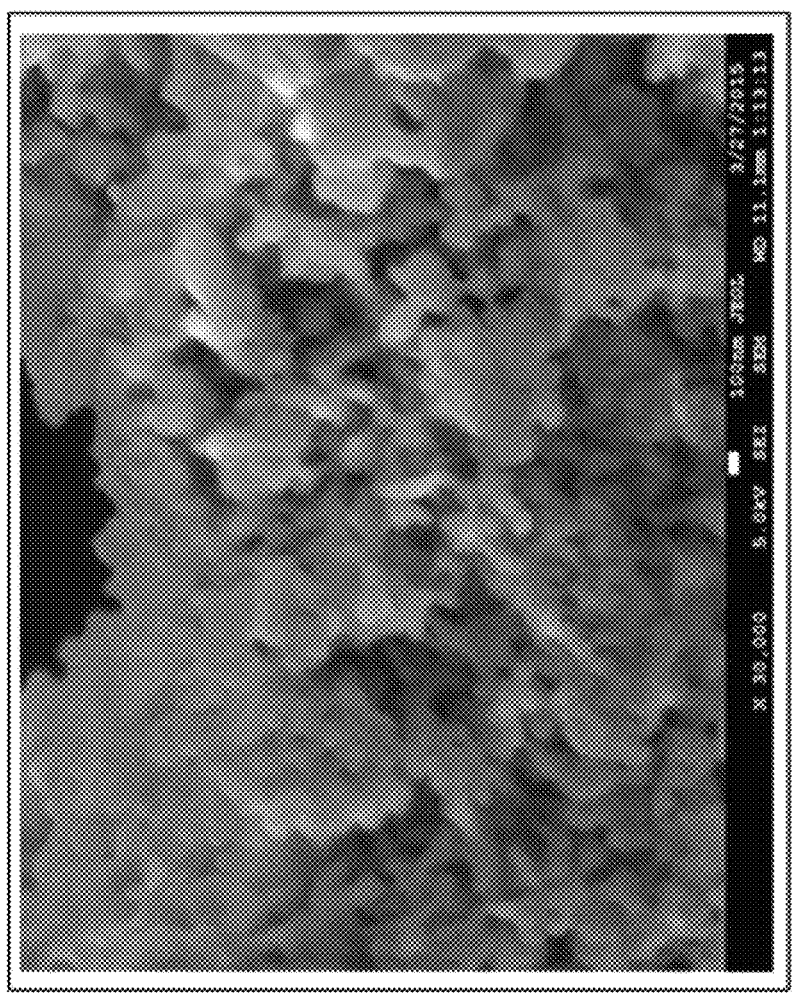
FIG. 4 is a high magnification SEM image of a $FePO_4 \cdot qH_2O$ sample.
Figure 5:
FIG. 5 is a high magnification SEM image of a second $FePO_4 \cdot qH_2O$ sample.
Figure 6B:
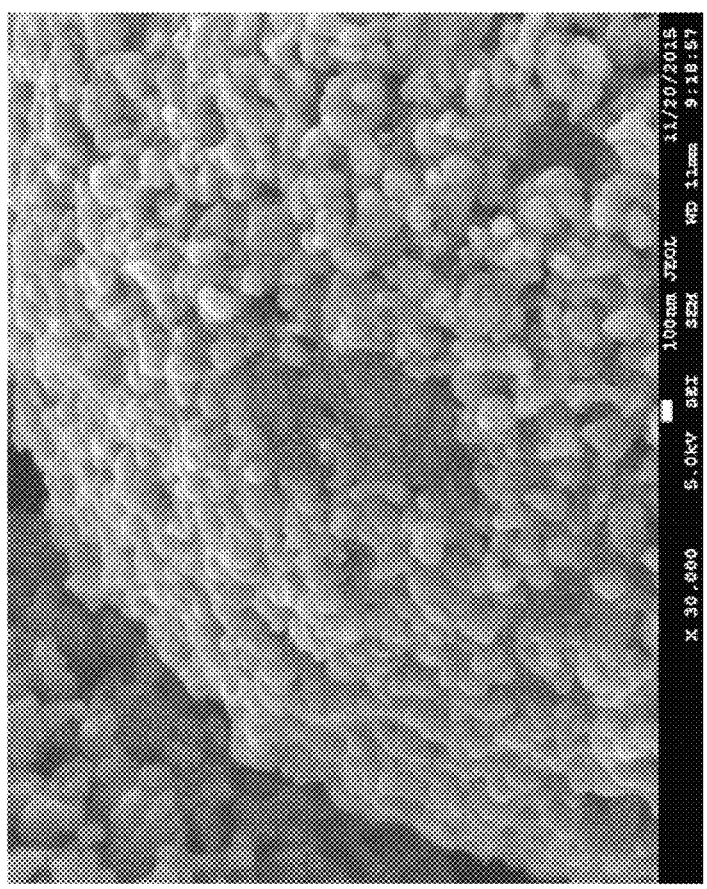
FIGS. 6A and 6B are low and high magnification images of pure phase (PP) $FePO_4$-LFP synthesized using the methods and precursors described herein.
Figure 6A:
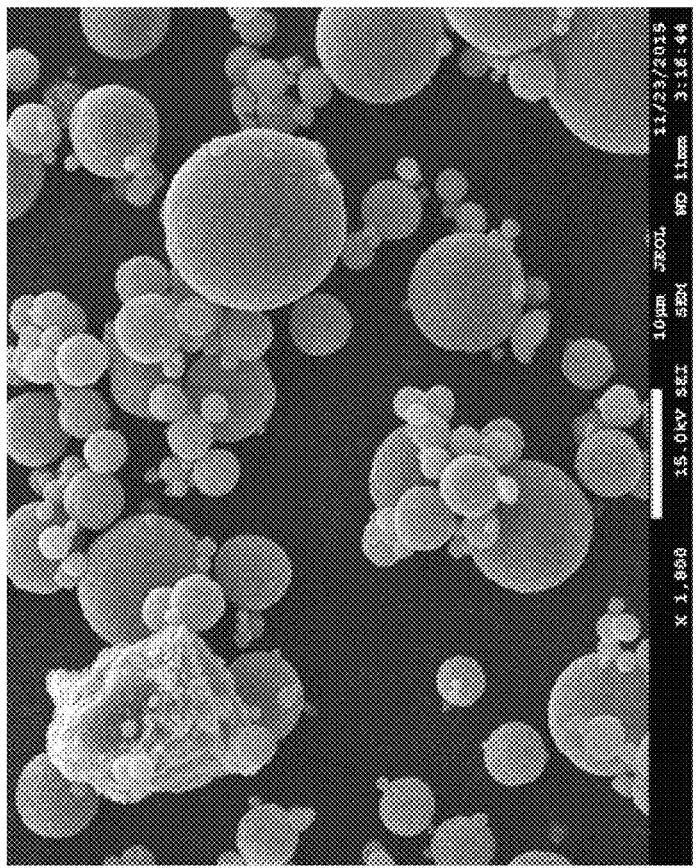
Figure 7:
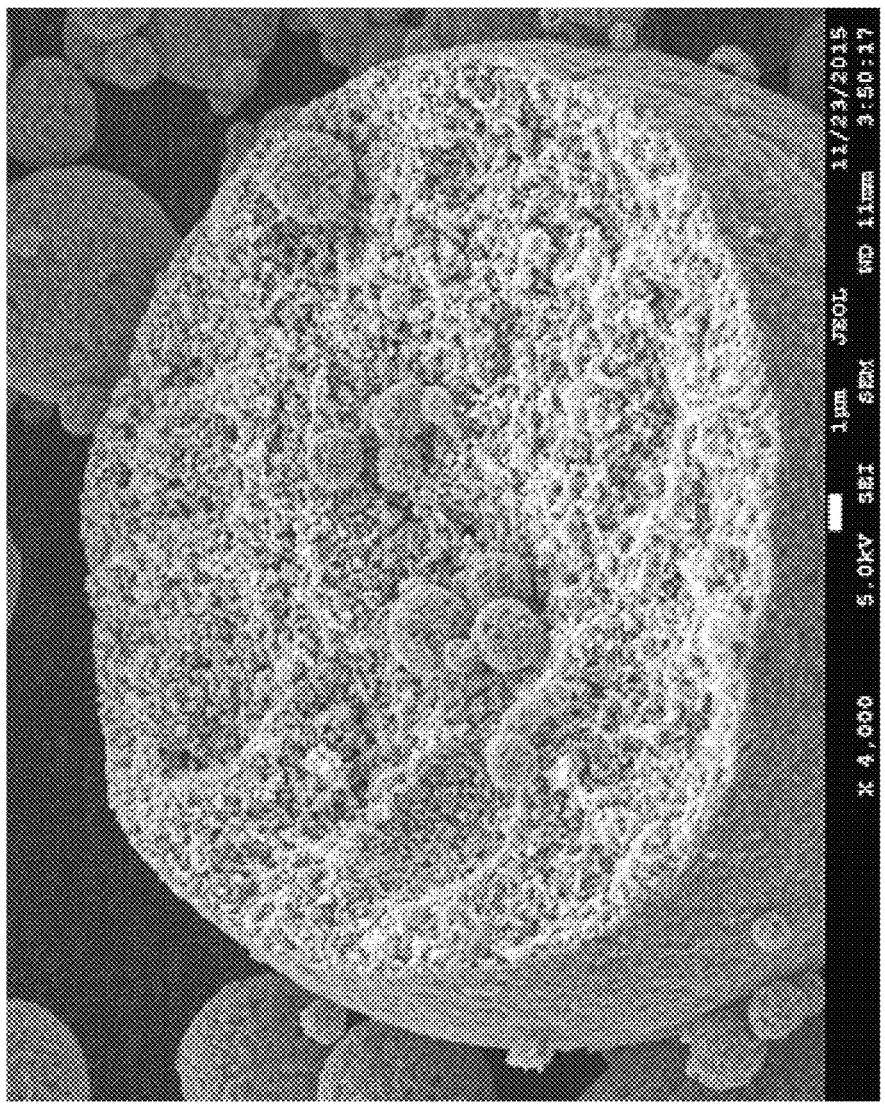
FIG. 7 is a magnified image of PP $FePO_4$-LFP synthesized using the methods and precursors described herein.
Figure 8:
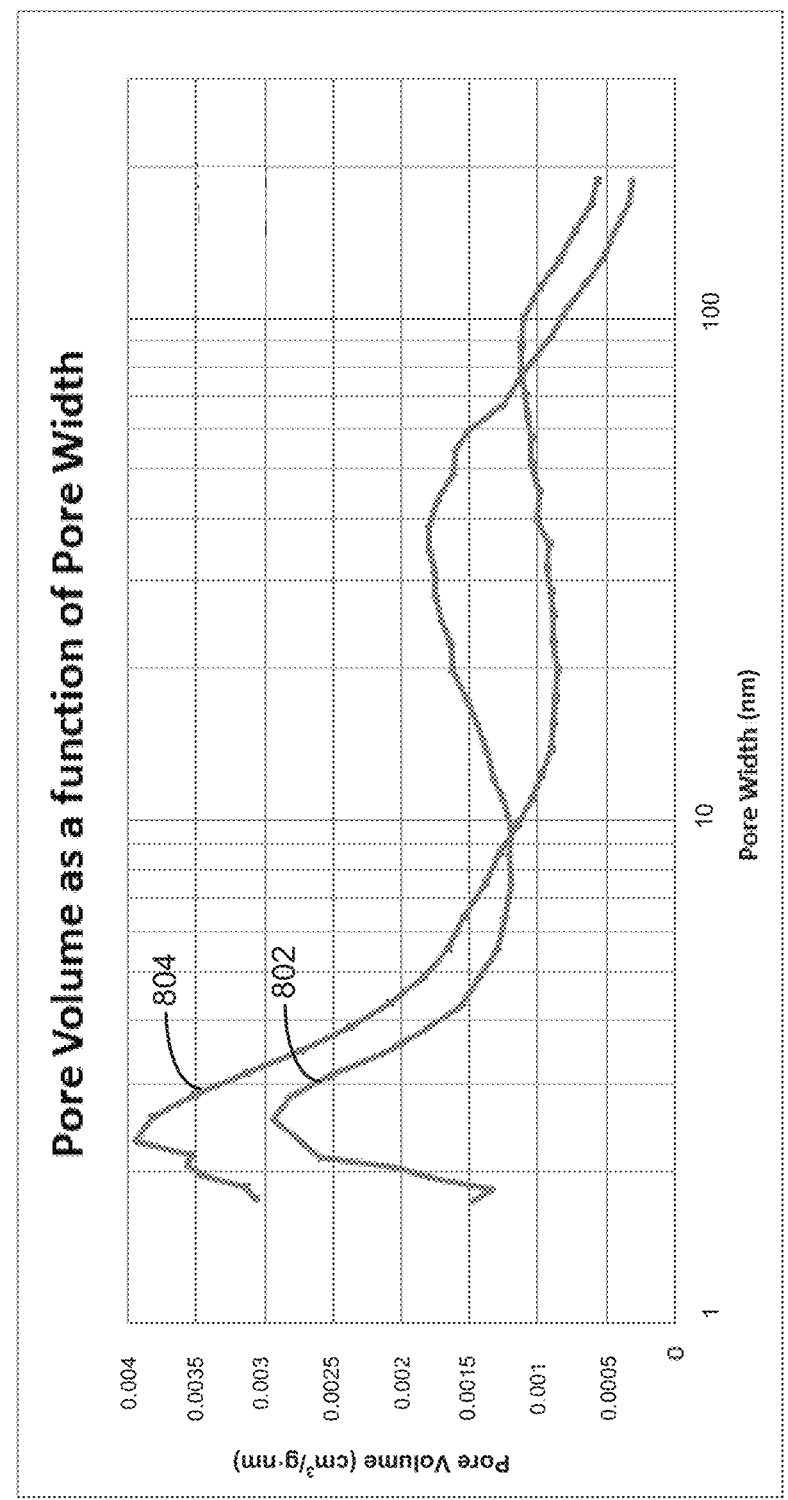
FIG. 8 is a pore size distribution curve of the modified PP $FePO_4$-LFP synthesized using the methods and precursors described herein as compared to spheniscidite $FePO_4$-LFP.
Figure 9:
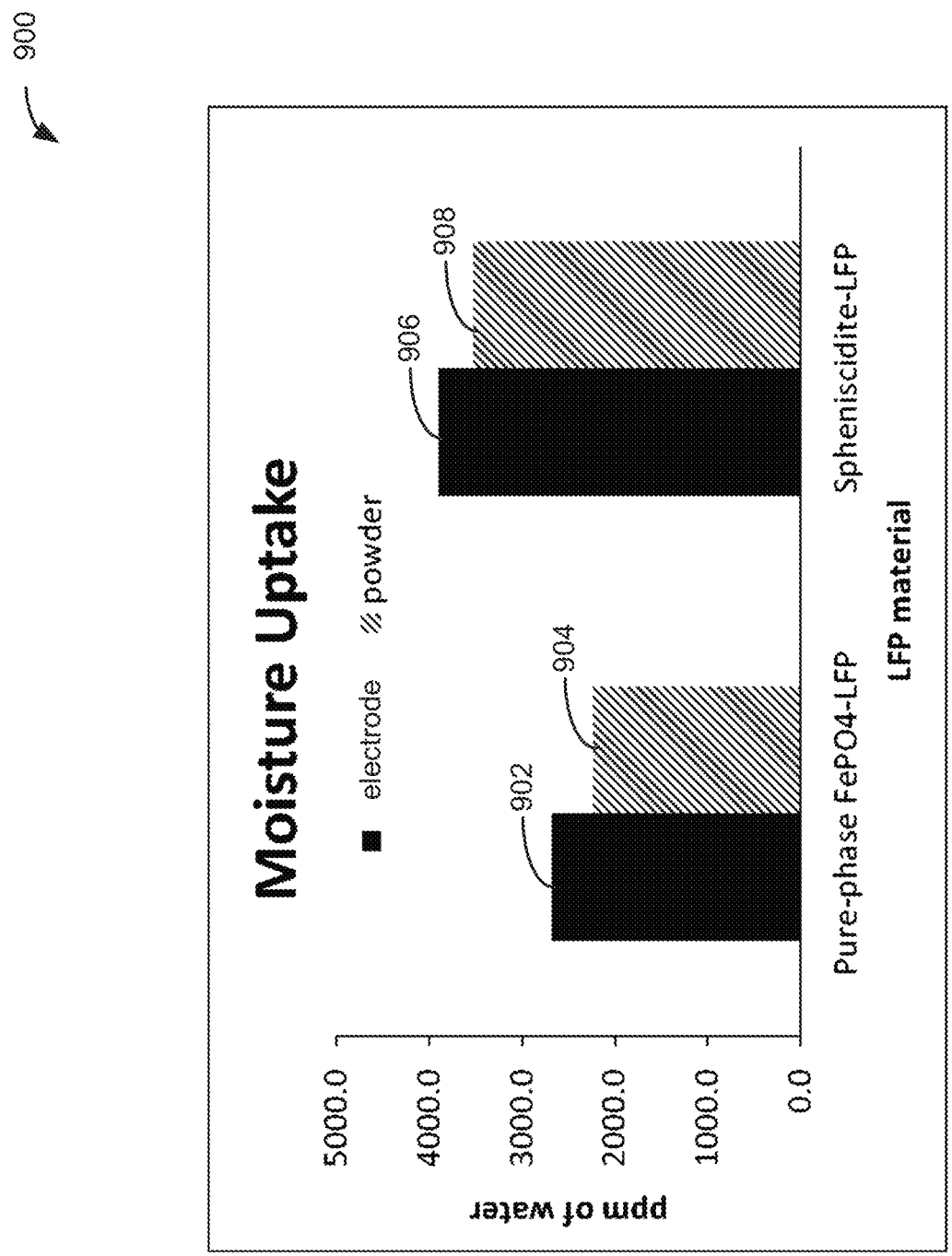
FIG. 9 is a chart comparing moisture uptake of spheniscidite $FePO_4$-LFP and PP $FePO_4$-LFP in powder and electrode forms.
Figure 10:
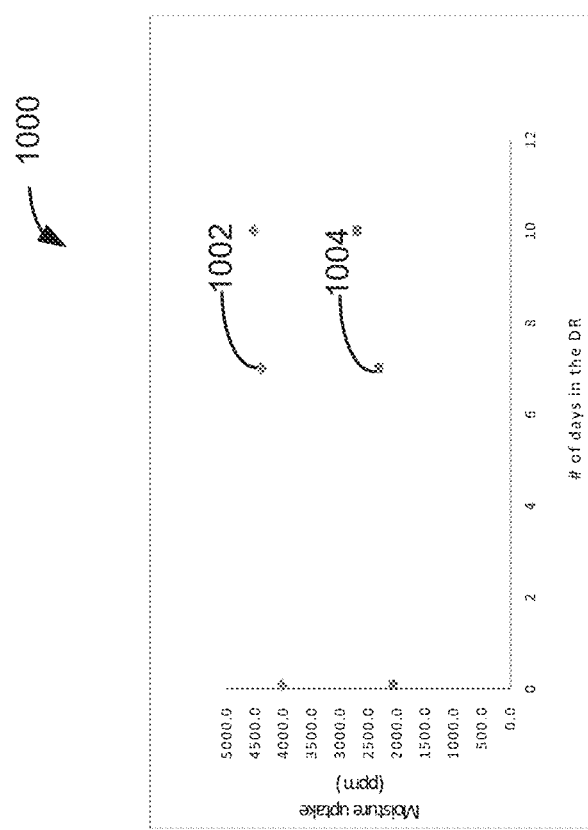
FIG. 10 is a chart comparing moisture uptake of spheniscidite $FePO_4$-LFP and PP $FePO_4$-LFP at different exposure times.
Figure 11:
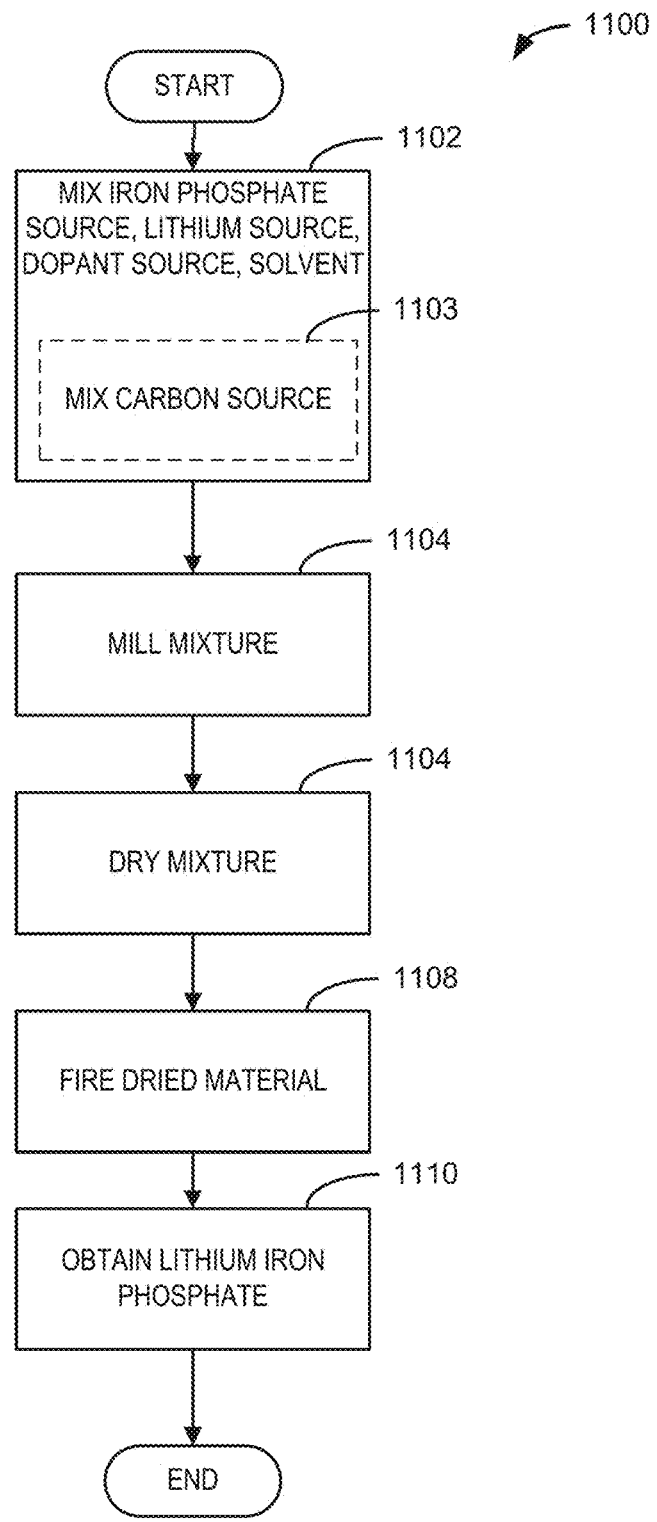
FIG. 11 is an example method for the synthesis of LFP with low or no $NH_3$ release using the disclosed dopant precursor(s).

The present disclosure provides an environmentally friendly LFP formulation utilizing low ammonium, or no ammonium, containing precursor species as well as replacing dopants precursors with more effective and benign materials. The disclosed LFP material reduces $NH_3$ emissions, and can completely eliminate $NH_3$ emissions, as illustrated in FIG. 1. This is in contrast to previous LFP synthesis methods and precursors as described in U.S. patent application Ser. No. 14/641,172. The LFP described herein is synthesized from dopants comprising safer metal ions, such as a trivalent vanadium ion. The trivalent vanadium ion may be provided as vanadium phosphate, for which an example synthesis method is illustrated in FIG. 2. The LFP also includes different $FePO_4$ precursors that were indicated in FIG. 1. These $FePO_4$ precursors have different crystalline structures and showed different morphology as shown in FIG. 3, FIG. 4, and FIG. 5. Using the different $FePO_4$ precursors, when compared to the prior art, did not negatively impact the primary particle size or the overall LFP particle morphology as illustrated in FIG. 6A, FIG. 6B, and FIG. 7. The different precursors and synthesis methods did, however, contribute to a beneficial change in the pore size distribution within the particles as illustrated in FIG. 8. The control of the pore size, pore size distribution, and pore volume may help in decreasing moisture uptake as shown in FIGS. 9 and 10. Synthesizing an LFP (as shown in FIG. 11) using the $FePO_4$ precursor described herein may result in the improved properties as displayed in FIGS. 12-16, with regards to FCC, DCR, surface area, 10 C capacity, etc. The high purity of the precursor material is important, and FIG. 17 further shows a thermal profile of said LFP precursor powder that may result in the aforementioned improved properties. As one example, the LFP precursor may experience a thermal weight loss of less than 40%, more specifically less than 30% and more specifically, less than 25%. Thus, an iron phosphate with no $NH_3$ release during synthesis, may be used to synthesize the LFP including a trivalent vanadium dopant to produce a high performance LFP, while also decreasing moisture uptake, and further may be incorporated into electrochemical cells, as shown in FIGS. 18 and 19.

In order to minimize, or completely eliminate, the $NH_3$ emission from the synthesis process, thereby improving the process described in the prior art, the source(s) of the emission and viable replacement candidates may be identified. This analysis is highlighted in the illustration shown in FIG. 1.

Turning to FIG. 1, the LFP as described herein may have two sources of $NH_3$ emissions. In other examples, additional sources of $NH_3$ emissions may be present and additional replacement candidates may be identified. As shown in schematic 100, the first and most significant source is the $FePO_4$ precursor and the second is the dopant precursor. As demonstrated by the illustration, when spheniscidite $FePO_4$, ($NH_4Fe_2(PO_4)_2OH \cdot 2H_2O$), is utilized as the $FePO_4$ source, significant $NH_3$ may be released. When the spheniscidite $FePO_4$ is replaced with $FePO_4 \cdot qH_2O$, where q can vary from approximately 0 to 2, the $NH_3$ emission from the $FePO_4$ source is eliminated. In one example, the $FePO_4 \cdot qH_2O$ may be a pure-phase $FePO_4$ (PP $FePO_4$) or a $FePO_4$ comprising a secondary impurity phase (SP $FePO_4$). The second source of $NH_3$ emission is associated with the ammonium vanadate ($NH_4VO_3$) dopant. The $NH_3$ may be eliminated by utilizing $VPO_4$, a chemically compatible species with LFP that is not commercially available and for which the novel synthesis is described as an embodiment of this present disclosure. In order to achieve the targeted LFP performance, as articulated herein, a cobalt based co-dopant has been investigated at low concentrations. While this precursor has the potential to release $NH_3$ during the LFP synthesis process, the release may be negligible and dramatically less when compared to the LFP synthesis described previously for current LFP materials. Alternatively, a cobalt precursor that does not release $NH_3$ has also been identified and is illustrated in FIG. 1. All different LFP samples that were investigated for this work used the $FePO_4 \cdot qH_2O$ (PP $FePO_4$ or including SP $FePO_4$), combined with $NH_4VO_3$ or $VPO_4$ dopant, and in the presence or absence of a cobalt based co-dopant.

The low $NH_3$ LFP method described herein includes iron phosphate precursors which comprise no ammonium in the formula that can be subsequently reduced to $NH_3$ during the synthesis process. The LFP synthesized from the iron phosphate precursor material further includes a P/Fe ratio of 1.000-1.050:1 in the final LFP powder. Additionally, the low $NH_3$ LFP method can include multiple dopant formulations as listed at FIG. 1. The dopant may substitute for the Fe in the LFP crystal lattice structure. The electrochemical performance and physical characteristics for LFP synthesized with varying vanadium dopant precursor concentrations, vanadium dopant precursor species, and the addition of a cobalt based co-dopant with $FePO_4 \cdot qH_2O$, where q can vary from approximately 0 and 2, are highlighted in Table I and Table II below.

TABLE I

Example dopant formulations for low $NH_3$ emission LFP method

| | Dopant (Molar %) | Carbon Content (%) | Tap Density (g/ml) | Surface Area ($m^2/g$) | FCC (mAh/g) | Discharge Capacity (mAh/g) 0.2 C | 10 C |
|---|---|---|---|---|---|---|---|
| Ex. 1 | 4% $VPO_4$ 0.25% $NH_4CoPO_4$ | 2.3 | 1.32 | 29.83 | 144.5 | 153.8 | 145.2 |
| Ex. 2 | 4% $VPO_4$ 0% $NH_4CoPO_4$ | 2.7 | 1.49 | 20.26 | 150.8 | 153.4 | 124.5 |

TABLE I-continued

Example dopant formulations for low $NH_3$ emission LFP method

| Dopant (Molar %) | Carbon Content (%) | Tap Density (g/ml) | Surface Area (m²/g) | FCC (mAh/g) | Discharge Capacity (mAh/g) | |
|---|---|---|---|---|---|---|
| | | | | | 0.2 C | 10 C |
| Ex. 3  4% $NH_4VO_3$ 0% $NH_4CoPO_4$ | 2.6 | 1.56 | 19.57 | 150.9 | 151.9 | 117.0 |
| Ex. 4  3% $NH_4VO_3$ 0% $NH_4CoPO_4$ | 2.8 | 1.59 | 19.91 | 148.9 | 150.3 | 117.7 |

There are a number of key, unexpected findings from the variation in synthesis precursors. Thus, simply replacing the spheniscidite $FePO_4$ and ammonium vanadate with $FePO_4*qH_2O$, where q is not optimized, and vanadium phosphate may not consistently yield the improved rate performance as outlined herein. While the target FCC and elimination of $NH_3$ emission from the synthesis may be achieved, the rate performance may not be as high as demonstrated in Ex. 2 highlighted in Table I. Additionally, replacing the spheniscidite $FePO_4$ with $FePO_4*qH_2O$, where q is not optimized, while utilizing the ammonium vanadate as the dopant precursor may also result in an LFP powder with unsatisfactory physical properties and electrochemical performance as highlighted in Table I, Ex. 3 and Ex. 4. It was unexpectedly found that a combination of the $FePO_4*qH_2O$, where q is not optimized, vanadium phosphate, and a cobalt based co-dopant included in the formulation resulted in the improved LFP material as demonstrated by Ex. 1 in Table I. For example, at the low molar percentage outlined in Table I, a substantial increase in the LFP surface area and rate capability was observed using 0.25% $NH_4CoPO_4$ in combination with the specific iron phosphate and vanadium source. This result demonstrates that a co-dopant approach in which the minority dopant is cobalt based with ammonium as a constituent of the precursor molecule increases the LFP particle surface area by approximately 50% as well as resulting in a 10 C discharge capacity greater than 140 mAh/g. However, the target FCC of greater than 150 mAh/g may not be achieved. In other examples, other cobalt based ammonium precursor molecules may increase the LFP material properties such that all of the target metrics are achieved.

Another potential iron phosphate precursor as highlighted in FIG. 1 that eliminates $NH_3$ emissions from the iron phosphate precursor during the synthesis process is $FePO_4.qH_2O$, where q is optimized, which also has a P/Fe ratio of 1.000-1.050:1 in the final LFP powder. As described in Table II below, this precursor was also utilized with multiple dopant species and formulations in order to attain the desired LFP physical and electrochemical characteristics described herein. As in the previously described synthesis with $FePO_4.qH_2O$, where q is not optimized, the dopant is substituting the Fe in the LFP crystal. The electrochemical performance and physical characteristics for LFP synthesized with varying vanadium dopant precursor concentrations and vanadium dopant precursor species with $FePO_4.qH_2O$, where q may vary from approximately 0 and 2 are highlighted in Table II.

TABLE II

Electrochemical performance and physical characteristics for LFP with varying vanadium dopant precursor concentrations

| Dopant (Molar %) | Carbon Content (%) | Tap Density (g/ml) | Surface Area (m²/g) | FCC (mAh/g) | Discharge Capacity (mAh/g) | |
|---|---|---|---|---|---|---|
| | | | | | 0.2 C | 10 C |
| Ex. 1  4% $NH_4VO_3$ | 2.7 | 1.26 | 24.19 | 150.9 | 155.3 | 141.6 |
| Ex. 2  4% $VPO_4$ | 2.8 | 1.34 | 26.16 | 152.6 | 157.7 | 142.6 |
| Ex. 3  2% $NH_4VO_3$ | 2.4 | 1.39 | 21.49 | 152.2 | 157.5 | 138.8 |
| Ex. 4  2% $VPO_4$ | 2.3 | 1.37 | 23.64 | 152.6 | 158.4 | 141.0 |

When using $FePO_4.qH_2O$, where q is optimized, and $VPO_4$ at a dopant concentration equivalent to that utilized in the spheniscidite $FePO_4$-LFP synthesis, the room temperature performance in terms of the FCC is superior when compared to spheniscidite $FePO_4$-LFP and the 10 C discharge are above the target value as demonstrated by Ex. 2 in Table II. As carbon content and tap density values are in a comparable range, the surface area, however, is below target which results in a DCR at −20° C. greater than the target resistance. Thus, the combination of $FePO_4.qH_2O$ and the vanadium dopant described above as precursors for LFP production significantly reduce and/or eliminate $NH_3$ emissions while coming close to meeting all of the target requirements as articulated herein. As an example, the $FePO_4.qH_2O$ where q may range between 0 and 2 and wherein the water may be present in the range of 0.0-20 wt. % may be provided. In another example, where q may be 0, the water may be present at less than 5 wt. %. In another example, the ammonium vanadate can be replaced by vanadium phosphate, thereby completely eliminating the $NH_3$ emission from the LFP synthesis and replacing the pentavalent vanadium with the more benign trivalent vanadium. As demonstrated by Table II, all electrochemical properties satisfy the above target values and all physical properties satisfy the target specifications with the exception of the surface area. The electrochemical performance coupled with the reduced $NH_3$ emissions and increased environmental friendliness of the synthesis process demonstrates the novelty of this synthesis method and precursor choice. It was found that while replacing the vanadium dopant source with $VPO_4$, the surface area was improved, albeit lower than the target, while maintaining the superior FCC and 10 C discharge capacity of greater than 150 mAh/g and 140 mAh/g, respectively. This may be due to increased dopant efficiency through a more homogeneous distribution of the vanadium throughout the LFP crystal structure.

In one example, the V dopant precursor is $VPO_4$ because it does not contain ammonium and is more benign than other commonly used vanadium metal ion dopants, such as pentavalent vanadium dopant. However, $VPO_4$ is not currently commercially available because previous syntheses are complicated, costly, and difficult to scale up.

As shown in FIG. 2, an example method 200 of synthesizing VPO$_4$ is illustrated. The disclosed method of VPO$_4$ synthesis involves the following chemical reaction:

$$V_2O_5 + 2NH_4H_2PO_4 + C \rightarrow 2VPO_4 + 2NH_3 + 3H_2O + CO_2$$

During the reaction, V$^{5+}$ is reduced to V$^{3+}$ to form VPO$_4$. The material processing for this reaction includes, at 202, pre-mixing precursors in solvent, at 204, stirring the slurry at an elevated temperature while adding a carbon source or reducing agent such as sugar, citric acid (CA), glucose or others. For example, a carbon source may comprise any organic carbon source that is at least moderately soluble in the reaction solvent such as glycol or PVB. Further, the solvent may comprise water or an organic solvent such as an alcohol. At 206, the slurry is milled for a moderate time, and at 208, the milled slurry is dried into powder form. At 210, the abovementioned chemical reduction utilizing a temperature programmed reaction (TPR) takes place as the powder is fired under an inert atmosphere. Once fired under an inert atmosphere, a high purity VPO$_4$ compound may be obtained at step 212. As an example of preparing VPO$_4$, precursors of V-oxide compound and phosphate source compound were mixed in solvent with slight heating where the slurry was stirred for 10-16 hours. As an example, vanadium precursors may comprise vanadium oxides and/or vanadate precursor species. The milled slurry was then spray dried and the powder was converted to VPO$_4$ by a TPR under an inert gas in a tube furnace. In some examples, the firing gas may comprise any noble gas or a mixture thereof such as N$_2$, Ar, and N$_2$/Ar. The phosphate source may comprise any species with a phosphate anion that is at least moderately soluble in the reaction solvent. For example, the phosphate source may comprise phosphoric acid, NH$_4$H$_2$PO$_4$, and (NH$_4$)$_2$HPO$_4$, or a combination thereof. In some examples, carbon may be present in the VPO$_4$ at less than 2.0 wt. %, less than 1.0 wt. %, and even less than 0.5 wt. %. The TPR profile may include ramping from room temperature and then heating to a specific temperature that may be used to complete the reaction conversion to form VPO$_4$. The TPR may further include programmed holds at specific temperatures. Furthermore, in the current disclosure it is taught that additional modifications increased the LFP performance while mitigating NH$_3$ emission during the synthesis process and moisture uptake when in the powder and the electrode form.

An example of the different FePO$_4$-LFP materials discussed above is shown in FIGS. 6A, 6B, and 7. Specifically, FIG. 6A is an SEM image that depicts the secondary particles of the PP FePO$_4$-LFP as disclosed herein. FIG. 6B is a higher resolution image that illustrates the morphology of the primary particles of PP FePO$_4$-LFP. In one example, the secondary particles may range from, using d$_{50}$ as the metric, 1-20 μm in one example, and 5-13 μm in another example. The primary particles may range from 25-250 nm in one example, and 25-150 nm in another example. In one specific example, the primary particles may comprise a size of less than 100 nm. Still, a further example may comprise primary particles comprising a size of less than 80 nm.

The FePO$_4$ precursor material discussed above may be used to form an electrochemically active LFP for use in an electrode, via the method as described in FIG. 11, for example. As shown in Table III below, the LFP may be formed by an above described FePO$_4$, a dopant, a co-dopant, a carbon source, and a lithium source, wherein the synthesized LFP has a formula that corresponds to Li$_z$Fe$_{(1-x-y)}$V$_x$Co$_y$PO$_4$ where z is greater than or equal to 1, x is greater than or equal to 0, and y is greater than or equal to 0. The FePO$_4$ may be PP FePO$_4$ or may include SP FePO$_4$, and may have an Fe content of at least 25 wt. %, or at least 30 wt. %, in another example. In a further example, the Fe content may be between 28-37 wt. %. Further, the FePO$_4$ precursor may have a phosphate to iron molar ratio as close to unity as possible. For example, FePO$_4$ precursors may be provided wherein the phosphate to iron molar ratios are within the ranges of 1.00-1.04:1, 1.00-1.02:1, or 1.00-1.01:1. Further, the phase impurity of the FePO$_4$ may be less than 10%, less than 5% in some examples, or less than 3% in other examples. Providing a phosphate to iron ratio as close to unity as possible is an indication of phase purity which may result in improvements in formula compositions and lessens the amount of precursor material needed to achieve an optimal composition, for example.

Figure 17:
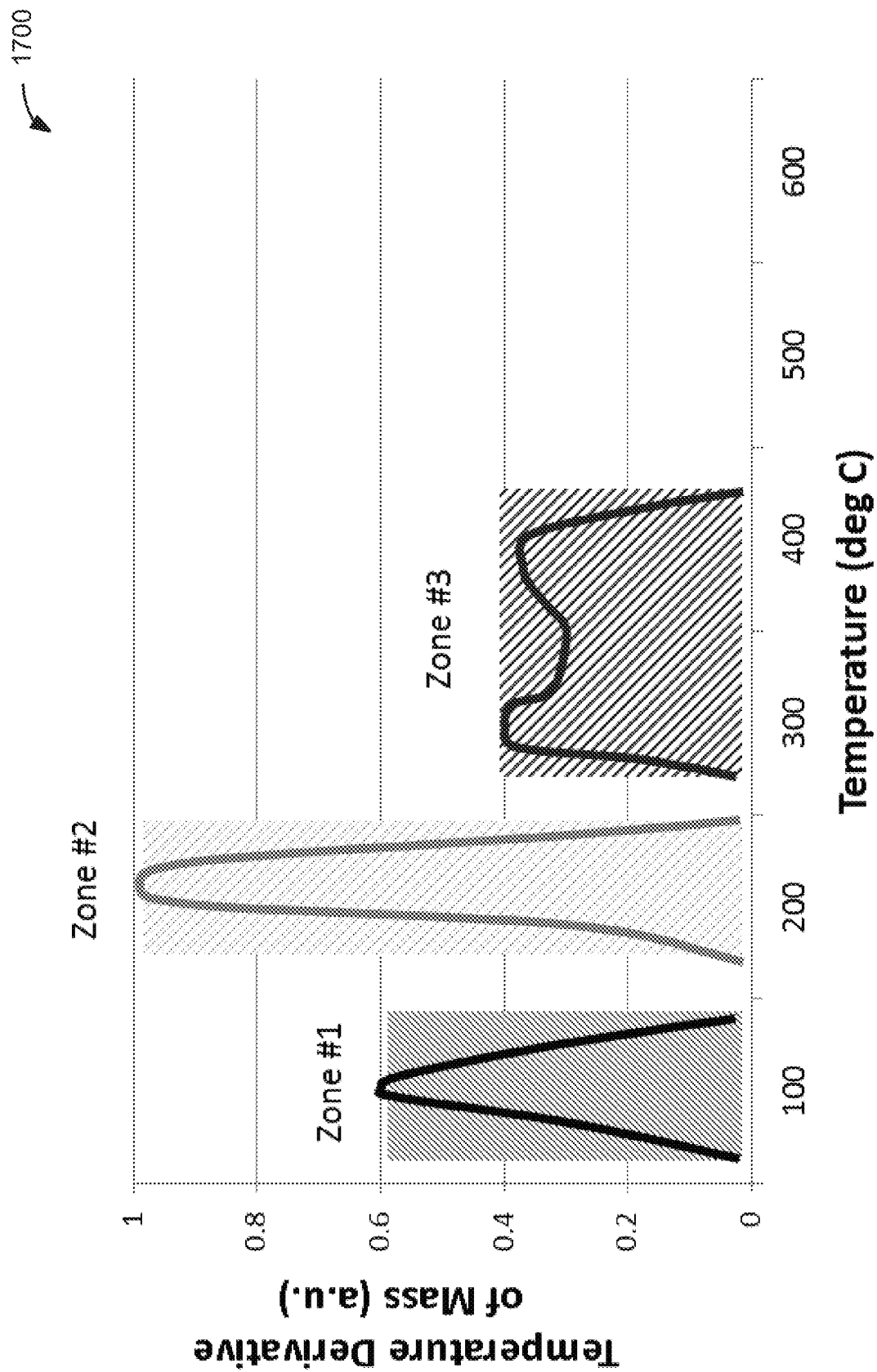
FIG. 17 shows an illustration of thermal zones from a thermal analysis.
Figure 18:
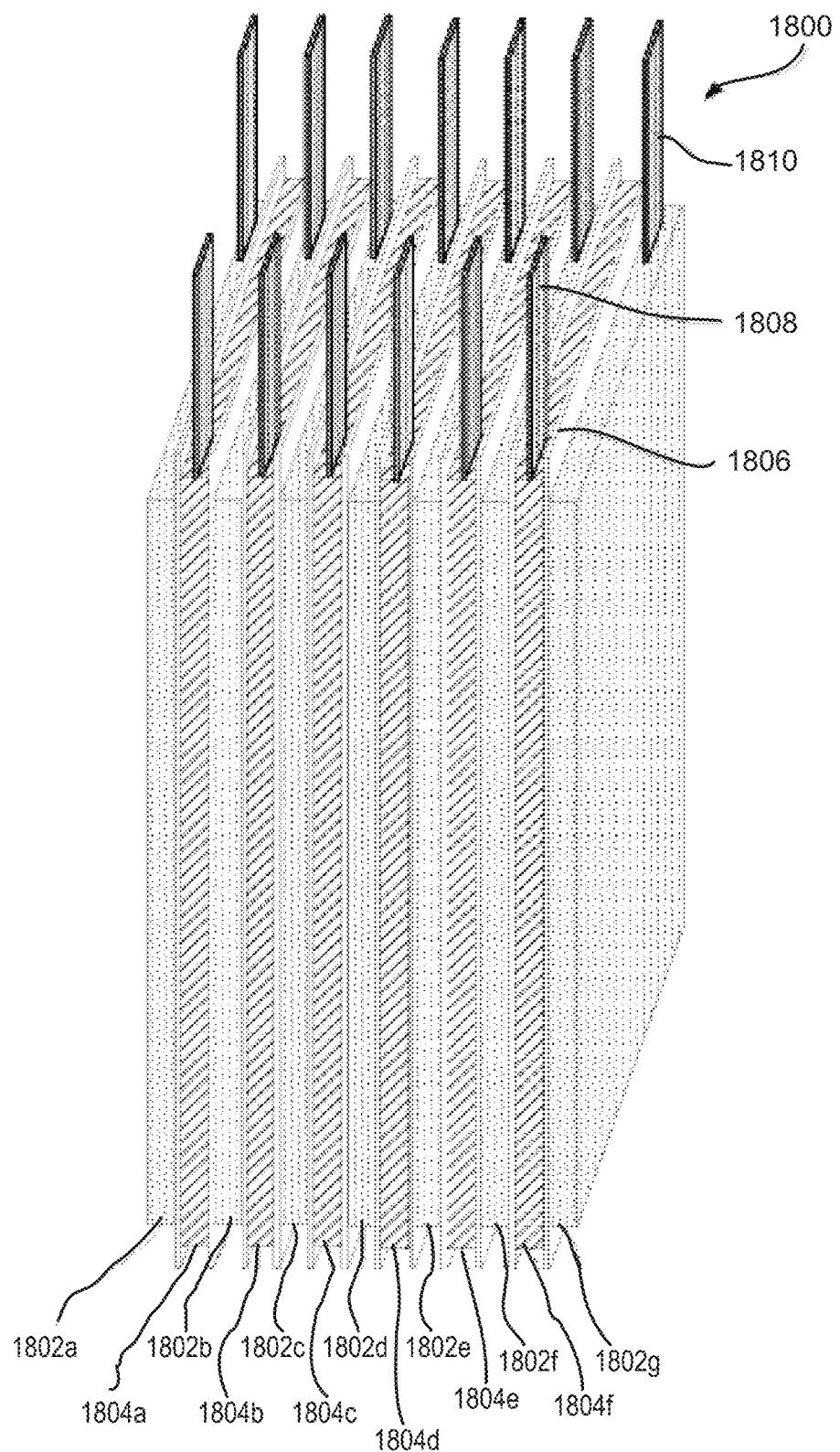
FIG. 18 shows an example electrode assembly.

Further as depicted in Table III, the above described FePO$_4$ precursor used in making the lithium iron phosphate may have a surface area of 10 to 40 m$^2$/g and the subsequent lithium iron phosphate precursor powder may have a thermal profile as illustrated in FIG. 17. As an example, other FePO$_4$ precursors are considered wherein the surface area may be within the ranges of 10-30 m$^2$/g or between 10-20 m$^2$/g.

A dopant may further be included in the electrochemically active material. In one example, VPO$_4$ is included. Additionally, a cobalt co-dopant may be added. In one example, the cobalt co-dopant may be NH$_4$CoPO$_4$. In another example, the cobalt co-dopant may be CoC$_2$O$_4$. A non-NH$_3$ emission synthesis approach may include, for example, the above described FePO$_4$ as depicted in Table III (PP FePO$_4$), VPO$_4$, and CoC$_2$O$_4$. A low NH$_3$ emission synthesis approach may include, for example, FePO$_4$ as depicted in Table III (PP FePO$_4$), VPO$_4$, and NH$_4$CoPO$_4$. Furthermore, a lithium source and carbon source may be added to synthesize the electrochemically active material, and the final LFP powder may have a surface area between 25 to 35 m$^2$/g. In some examples, the lithium source may comprise Li$_2$CO$_3$, LiH$_2$PO$_4$, or any other suitable lithium source. It will be appreciated that the lithium sources are provided as exemplary species and that any suitable lithium source may be used. The total non-lithium metal to phosphate ratio may range from 1.000-1.040:1 in one example, or 1.001-1.020:1 in another example. As a further non-limiting example, the total non-lithium metal to phosphate ratio may range from 1.0025-1.0050:1. The above ranges demonstrated high cell performance, as discussed further below. Additional compatible substances may be added to achieve the disclosed ratios, the technique for which is known to a person of ordinary skill in the art.

In order to understand V—Co co-dopant effects on electrochemical energy storage performance, a group of LFP laboratory samples were synthesized with PP FePO$_4$ precursor and 0.0-5.0 Mol. % VPO$_4$ and 0.0-1.0 Mol. % NH$_4$CoPO$_4$ or CoC$_2$O$_4$ as a V—Co co-dopant precursors. In one example, the LFP electrochemically active material in the current disclosure may comprise a vanadium dopant, such as the vanadium dopant synthesized in FIG. 2. It will be appreciated that in at least one example, the vanadium dopant may be contributed by an oxyanion species such as an oxide, carbonate, oxalate, phosphate, or other suitable sources for which vanadium is considered the cation. In one example, the vanadium dopant source may comprise one or more of VPO$_4$ and NH$_4$VO$_3$. Additionally, the electrochemically active material may comprise a cobalt co-dopant, such as CoC$_2$O$_4$ or NH$_4$CoPO$_4$, at 0.0 to 0.5 Mol. %.

TABLE III

Characteristics of $FePO_4 * qH_2O$; dopant; co-dopant (optional); lithium source example, LFP precursor power; and LFP final powder

| | RANGE |
|---|---|
| $FePO_4 * qH_2O$ | $0 \leq q \leq 2$, approximately |
| Fe content | 28 to 37 wt. % |
| P/Fe ratio | 1.000-1.040 |
| Surface Area | 10 to 40 m$^2$/g |
| Dopant | |
| $VPO_4$ or $NH_4VO_3$ | 0.0-5.0 Mol. % |
| Co-Dopant | |
| $NH_4CoPO_4$ or $CoC_2O_4$ | 0.0-1.0 Mol. % |
| Lithium Source | $Li_2CO_3$; $LiH_2PO_4$; or other lithium source |
| LFP Precursor Powder | |
| Thermal Profile | 3 key thermal peaks at 75-125° C., 175-250° C., and at 275-425° C. |
| LFP Final Powder | |
| Total non-lithium metal to phosphate ratio | 1.000-1.040 |
| Total P/Fe ratio | 1.000-1.050 |
| Surface Area | 25-35 m$^2$/g |
| Particle size | Secondary: d50: 1-20 μm; optimal 5-13 μm; Primary: 25-150 nm; preferred: <100 nm optimal: <80 nm |

As noted above, one of the findings of the LFP cathode material covered in U.S. patent application Ser. No. 14/641,172 is that of high water uptake. Spheniscidite $FePO_4$-LFP, with its high surface area and high concentration of pores with an average diameter on the order of 100-500 nm, may be sensitive to water. This uptake may occur even at low levels of exposure, which utilizes more stringent control of the environment during the handling and processing of this material. Processing includes, but is not limited to, electrode coating, electrode stamping (or other such handling process), and cell assembly. A concern associated with water presence in a final cell at appreciable concentrations is the production of hydrogen gas due to electrochemical reduction of water at the anode, or negative electrode. In addition, the presence of moisture in the cell may react with various constituents of the electrolyte to form other by-products, including HF, which may cause dissolution of the metal in the cathode and/or the metal in the current collectors and therefore degrade cell performance.

Having a high surface area cathode material for lithium ion battery applications is preferred, and in fact may be a key characterization metric. High water uptake, in which the absolute quantity can increase with an increase in surface area due to more active sites for water uptake, is a concern. In order to address this concern, an optimized particle interior structure for the LFP can mitigate the water uptake. The particle structure of interest in this case is pore size, total pore volume, and the pore size distribution. In some examples, the majority of the pores may comprise a size of less than 150 nm, less than 50 nm, or less than 15 nm. In one example, if the total pore volume normalized by the mass of the powder for a given set of LFPs is equivalent, and the pore size can be decreased with the majority of the pores confined to a diameter of approximately 10 nm or less, an appreciable decrease in the moisture uptake may occur. For example, the pore size distribution of spheniscidite $FePO_4$-LFP showed the presence of two pore diameter ranges, the first was centered at a diameter of approximately 2.5 nm while the other occurred over a broad range diameter range of 10-100 nm. The total pore volume normalized to the mass is calculated by integrated the area under the pore size distribution curve as showed in FIG. 8 and has been measured at 0.19 cm$^3$/g. In some examples, the cumulative pore volume may comprise a value of greater than 0.08 cm$^3$/g. In other examples, cumulative pore volume may be greater than 0.15 cm$^3$/g. As another non-limiting example, the cumulative pore volume may be greater than 0.18 cm$^3$/g.

Specifically, as shown in FIG. 8, chart 800 depicts a gravimetrically normalize pore volume in units of (cm$^3$/g× nm) as a function of pore width, which can be indicated as the pore diameter. Pore size distribution is shown at 802 for spheniscidite $FePO_4$-LFP and at 804 for PP $FePO_4$-LFP. At around 2.5 nm pore width, PP $FePO_4$-LFP exhibits a larger pore volume compared to spheniscidite $FePO_4$-LFP. Conversely, at about 20 nm pore width, spheniscidite $FePO_4$-LFP exhibits a larger pore volume compared to PP $FePO_4$-LFP. In one example, the PP $FePO_4$-LFP may thus exhibit a different overall structure than that of spheniscidite $FePO_4$-LFP, wherein PP $FePO_4$-LFP comprises generally smaller pores. As such, PP $FePO_4$-LFP may exhibit different moisture uptake properties, as discussed further below. It is noted that although there are significant differences in pore size distribution, an equivalent cumulative pore volume is held for both species.

As shown in Table IV below, the equivalent cumulative pore volume allows for PP $FePO_4$-LFP to have a surface area consistent with that of spheniscidite $FePO_4$-LFP. Moreover, the carbon amount (%) and tap density may be consistent as well. Thus, PP $FePO_4$-LFP may maintain the advantages associated with high surface area and total pore volume in relation to power performance, while also exhibiting a pore size distribution that may mitigate moisture uptake. Furthermore, the similarity of tap density and surface area as well as the carbon content between the samples eliminates these factors as causes for the observed moisture uptake differences.

TABLE IV

Example comparison of spheniscidite $FePO_4$-LFP and PP $FePO_4$-LFP

| Sample | Tap Density (TD) | Surface Area (m$^2$/g) | Carbon % |
|---|---|---|---|
| spheniscidite $FePO_4$-LFP | 1.1-1.5 | 27-31 | 2.5 ± −0.4 |
| PP $FePO_4$-LFP | 1.2-1.4 | 25-35 | 2.5 ± −0.4 |

The moisture analysis showed a reduced total moisture uptake in both powder and electrode forms at different controlled exposure time for a PP $FePO_4$-LFP when compared to spheniscidite $FePO_4$-LFP, as shown in FIGS. 9 and 10. The samples were dried in a vacuum oven at 85° C. for approximately 18-24 hours. The samples were kept in the dry room, and samples were analyzed after 2 hr, 1 week, and 10 days using Karl Fisher equipment and processed at 220° C. A reduction in the absolute moisture uptake is an advantageous material structure improvement as it increases material stability, performance, and safety. As an example, lithium-ion cells that were built and tested with higher water content (Example cells 1 and 2 in Table V) experienced an increase in the total gas production when in the charged state. Analysis of this gas showed a high hydrogen gas concentration while a lithium-ion cell built with a reduced water concentration in the electrode (Example Cell 3 in Table V) did not produce a measurable amount of gas and the measured hydrogen gas concentration was approximately an order of magnitude lower.

TABLE V

Gas analysis of lithium-ion cells that were built with high and low moisture

| | High Moisture | | | | Low Moisture | |
|---|---|---|---|---|---|---|
| | Example Cell 1 | | Example Cell 2 | | Example Cell 3 | |
| Gas Analysis | 1st draw | 2nd draw | 1st draw | 2nd draw | 1st draw | 2nd draw |
| Hydrogen | 41.6% | 45.9% | 31.4% | 29.3% | 2.9% | 3.9% |

As shown in FIG. 9, data with relation to moisture uptake is provided in chart 900, which compares the moisture uptake between spheniscidite $FePO_4$-LFP and PP $FePO_4$-LFP in electrode and powder forms. Specifically, the electrode comprising PP $FePO_4$-LFP is at 902 and the PP $FePO_4$-LFP powder is at 904. The electrode comprising spheniscidite $FePO_4$-LFP is at 906, and the spheniscidite $FePO_4$-LFP powder is at 908. As shown, the moisture uptake of spheniscidite $FePO_4$-LFP is about 30-40% higher than that of PP $FePO_4$-LFP. Moisture uptake is believed to be related to the stability of the cell, e.g., less moisture uptake is important for performance stability and low gassing. PP $FePO_4$-LFP shows less water uptake, and thus may experience less gassing and significantly less hydrogen production. In part due to lower moisture uptake, PP $FePO_4$-LFP is easier to process from a production stand-point and may show improved stability. In one example, the smaller pore size distribution of the PP $FePO_4$-LFP changes the structure of the LFP and mitigates moisture uptake, which makes the material easier to handle and enhances cell performance. In one example, an electrochemical cell comprising PP $FePO_4$-LFP, may mitigate hydrogen production such that it constituents less than 5% of the gas phase volume or less than 10% in another example. In comparison, an electrochemical cell comprising known LFP formulations may have a hydrogen concentration in the gas phase higher than 30%. In this way, PP $FePO_4$-LFP as disclosed may not have significant gassing and comprises a low or negligible hydrogen concentration in the gas phase.

FIG. 10 also depicts moisture uptake comparison in chart 1000. As shown, spheniscidite $FePO_4$-LFP 1002 showed a significantly higher moisture uptake in a dry room than PP $FePO_4$-LFP 1004 as a function of exposure time. Additionally, the data demonstrate that the both species uptake a significant portion of the total moisture in the initial exposure time, however, that concentration is significantly higher for spheniscidite $FePO_4$-LFP.

Further development of LFP composition optimization in the current disclosure focuses on the performance-composition relationship of LFP cathode materials synthesized with the PP $FePO_4$. As previously discussed, low temperature performance is an important parameter for composition optimization since it is critical for lithium-ion starter batteries, start/stop battery applications, and other low voltage lithium-ion battery automotive applications.

Turning to FIG. 11, an example method 1100 is outlined for the synthesis of LFP from an iron phosphate source described herein. The final LFP material may be formed by combining a lithium source, dopant source, carbon source, and the iron phosphate source in a solvent by mixing, milling, drying, and promoting a chemical reduction with a TPR under an inert atmosphere such as $N_2$. The resulting LFP active material may then be useable as a cathode in an electrochemical cell.

At 1102, the method may include mixing an iron phosphate source, a lithium source, dopant source and a carbon source in a solvent to form a slurry. In one example, the lithium source may be $Li_2CO_3$ or $LiH_2PO_4$. In one example, the iron phosphate source may be $FePO_4*qH_2O$. In yet another example, the iron phosphate source may be the iron phosphate source as shown in Table III, e.g., a PP $FePO_4$ or an SP $FePO_4$, with an Fe content of 28 to 37 wt. % and a P/Fe molar ratio of 1.000-1.040:1. Further, the iron phosphate source may have a surface area of 10 to 40 $m^2/g$. In one example, the solvent may include an alcohol. In another example, the solvent may include water. Thus, the method may include an organic solvent or water based (aqueous) slurry. In one example, the dopant source may be $VPO_4$, such as the one synthesized in method 200. In another example, the dopant source may be $NH_4VO_3$. Further, the dopant source may include a co-dopant source. As such, a co-dopant may also be mixed into the slurry, wherein the co-dopant may be $NH_4CoPO_4$. In another example, the co-dopant may be $CoC_2O_4$. Further, the slurry may contain about 0.0-5.0 Mol. % vanadium source (dopant) and about 0.0-1.0 Mol. % co-dopant. A carbon source or more than one carbon source may be included at 1103. Once the iron phosphate source, the lithium source, the dopant source, and the carbon source are mixed in a solvent, at 1104, the method may include milling the mixture of 1102/1103.

At 1106, the method may include drying the milled mixture of 1104 to obtain an LFP precursor powder. The mixture may be dried using a variety of methods known to the industry. In one example, the LFP precursor powder may comprise a thermal profile with three major thermal zones as discussed with regard to FIG. 17.

At 1108, the method may include firing the dried material of 1106. The material may be fired to convert the material to the desired LFP by TPR. The TPR may be run in an inert atmosphere, for example $N_2$. The dried powder may be converted to the desired LFP by a TPR in $N_2$ flow in a tube furnace, a roller hearth kiln, or a rotary calciner for example. The TPR profile may include ramping from room temperature and then heating. The TPR may further include programmed holds at specific temperatures. At 1110, the method may obtain the desired LFP.

Figures 12A, 12B:
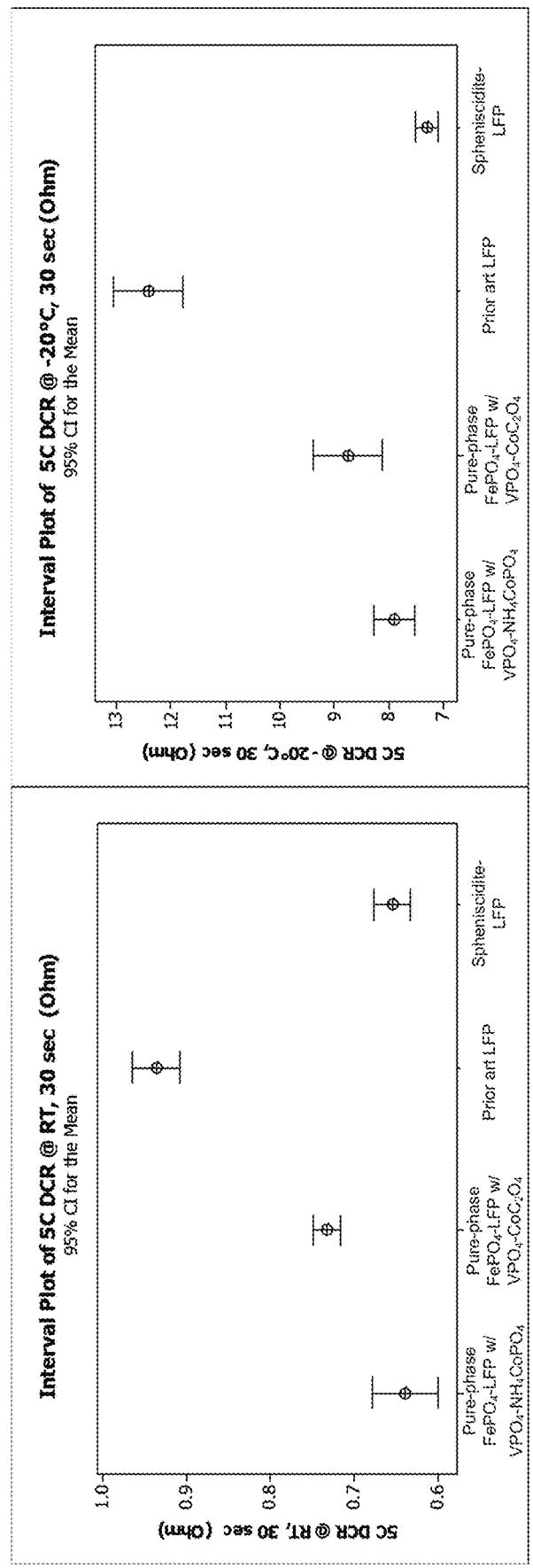
FIGS. 12A and 12B are interval plots of the various LFP samples described herein that compare the DCR at room temperature and −20° C.

FIGS. 12A and 12B illustrate DCRs at room temperature and $-20°$ C. measured from DLP cells containing PP $FePO_4$-LFP samples using $NH_4CoPO_4$ and $CoC_2O_4$ as Co dopant precursors. The DCR at room temperature and $-20°$ C. measured from DLP cells, with spheniscidite $FePO_4$-LFP and a prior art LFP powder are also listed as references. At room temperature, PP $FePO_4$-LFP samples using $NH_4CoPO_4$ as the Co dopant precursor showed comparable DCR results as that to spheniscidite-$FePO_4$-LFP. At $-20°$ C., PP $FePO_4$-LFP samples using $NH_4CoPO_4$ as Co dopant precursors showed a lower DCR than that of PP $FePO_4$-LFP samples using $CoC_2O_4$ as the Co dopant precursor indicating a more robust sample for higher power capability at $-20°$ C., although the DCR of both PP $FePO_4$-LFP samples met the low temperature DCR performance target of less than 9 ohm for 20 mAh DLP cells at $-20°$ C. In this specific example, the dopant efficiency of $NH_4CoPO_4$ may be higher than that of $CoC_2O_4$ because $NH_4CoPO_4$ has a similar molecular structure to $FePO_4$ bulk materials. It should be appreciated, in other examples, that depending on the Fe phosphate, the $CoC_2O_4$ may be optionally preferred depending on the overall system.

Additional results associated with this current disclosure are co-dopant incorporation and how the chemical structure of the dopant impacts doping efficiency. Specifically described herein is an amorphous $NH_4CoPO_4$ that is chemically compatible with the final LFP product, has a high surface area, and is readily dispersed in the synthesis solvent. These three attributes result in a high doping efficiency that ensures effective and homogenous incorporation of the dopant even at low concentrations. The vanadium phosphate, a crystalline material, is less soluble in the synthesis solvent. However, because the molecular structure of $VPO_4$ is comparable to that of $FePO_4$, increased dopant efficiency is achieved when compared to that of ammonium vanadate. Thus, chemical compatibility, especially associated with the anion, may be a driving force for effective dopant incorporation.

Transition-metal-ion doped LFP has been reported in the literature as an effective route to enhance mass transport of charged species through the LFP crystal structure. This enhanced transport typically results in an elevated level of higher power when compared to non-doped LFP if the doping efficiency of the dopant is high. Effective doping can result in a homogenous distribution of the dopant throughout the LFP crystal structure. This homogenous distribution, in conjunction with the transition metal-ion radius mismatch between the iron and the dopant, may result in impeded LFP crystalline growth during the sintering/calcination process, thereby resulting in smaller LFP crystals with high surface area, smaller grain boundaries, and the desired surface features. As previously described by the above teachings, the choice of dopants, precursor materials, and processing/synthesis techniques are believed to result in effective doping, which results in an LFP powder similar to that of spheniscidite $FePO_4$ LFP without the $NH_3$ emissions and a more environmentally benign vanadium precursor.

Vanadium-doped LFP has been previously used to enhance Li-ion conductivity (for example see U.S. Pat. No. 7,842,420 titled "Electrode Material with Enhanced Ionic Transport Properties"). $CoC_2O_4$, $V_2O_5$, and $NH_4VO_3$ have also been used as dopant precursors for synthesis of doped LFP. In this current disclosure, $NH_4CoPO_4$ and $VPO_4$ were chosen as non-obvious dopant precursor molecules because they have a similar chemical structure to $FePO_4$. This similar structure may result in a higher degree of chemical compatibility because all of the species share a common anion which may lead to higher dopant efficiency. Another reason for using $VPO_4$ as the dopant precursor of choice is that V (III) is more benign than V (V), as discussed previously.

In addition to an enhanced chemical compatibility resulting in higher doping efficiency, the morphology and crystalline structure of the $FePO_4$ precursor may also play an important role in attaining the needed physical and electrochemical properties of above described synthesized LFP. When investigating the three different $FePO_4$ precursor materials utilizing Scanning Electron Microscopy (SEM), it is clear that the speniscidite $FePO_4$ and $FePO_4 \cdot qH_2O$ precursors with an optimized water content have a different nanoscale morphology, as illustrated in FIGS. 3-5. This distinction along with the different crystalline structures of the above $FePO_4$, could contribute to the resulting electrochemical performance of the LFP. It is therefore non-obvious that the $FePO_4$ precursor morphology, such as that observed with $FePO_4 \cdot qH_2O$ with the optimized water content, is utilized as criteria for precursor selection while simultaneously considering the use of a chemically compatible trivalent vanadium phosphate as the dopant precursor species. Close investigation of the diffraction patterns clearly demonstrate that the crystalline system of the optimized $FePO_4 \cdot qH_2O$ is hexagonal while the spheniscidite $FePO_4$ and the non-optimized $FePO_4$ crystalline systems are monoclinic. Specifically, different crystalline structures of $FePO_4$ may lead to different and/or enhanced characteristics. As highlighted above, efficient dopant incorporation unexpectedly may result in smaller LFP crystalline size and grain boundaries due to metal-ion radius mismatch. This smaller size coupled with homogeneous dopant incorporation may enhance the electrochemical performance of the resulting LFP powder, which is demonstrated by the data tabulated in Table II.

When considering the non-optimized $FePO_4 \cdot qH_2O$ as the main precursor material while simultaneously replacing the ammonium metavanadate dopant with $VPO_4$, it is demonstrated herein that a high surface area may not be maintained and the power performance may suffer; albeit the target FCC is achieved. However, a very significant increase in surface area and boost in power performance may be realized by adding $NH_4CoPO_4$ as a minority co-dopant with as little as 0.5% on a molar basis for example. This result is attributed to increased dopant incorporation into the final system as the $NH_4CoPO_4$ and $VPO_4$ molecular structures are more chemically comparable to that of $FePO_4$. An additional consideration is that the negligible release of $NH_3$ due to the decomposition of the cobalt dopant precursor may facilitate the synthesis of a smaller primary particle size through a similar mechanism believed to be in play when using speniscidite as the $FePO_4$ precursor, even though the amount of $NH_3$ released is significantly lower. It will be appreciated that in at least one example, the cobalt dopant may be contributed by an oxyanion species such as an oxide, carbonate, oxalate, phosphate, or another suitable source for which cobalt is considered the or one of multiple cations in the ionic species. In one example, the cobalt dopant may comprise one or more of $CoC_2O_4$, and $NH_4CoPO_4$.

Figure 13:
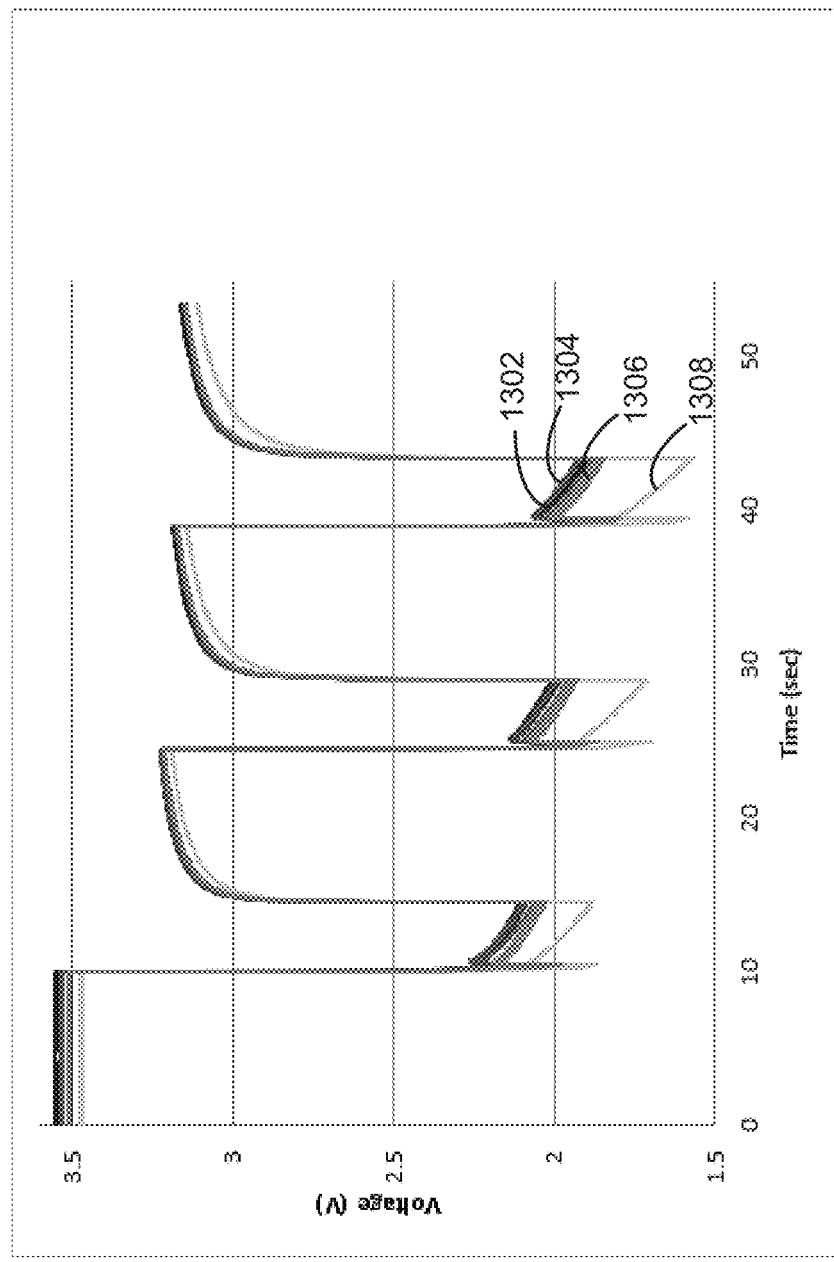
FIG. 13 is a voltage versus time plot that provides an indication of the cold crank capability of the various LFP samples described herein at −30° C.

Turning to FIG. 13, power response is measured from a DLP, as described above, using a cold crank test at −30° C. shown in 1300. 1302 indicates PP $FePO_4$-LFP with a $VPO_4$—$NH_4CoPO_4$ co-dopant, 1304 indicates spheniscidite $FePO_4$-LFP, 1306 indicates PP $FePO_4$-LFP with a $VPO_4$—$CoC_2O_4$ co-dopant, and 1308 indicates a prior art $FePO_4$-LFP formulation. As shown, both PP $FePO_4$-LFP formulations have similar performance to that of spheniscidite $FePO_4$-LFP. In one example, the formulations for 1302 and 1306 may include ranges shown in Table III and may be synthesized as described in method 1100.

Figures 14A, 14B:
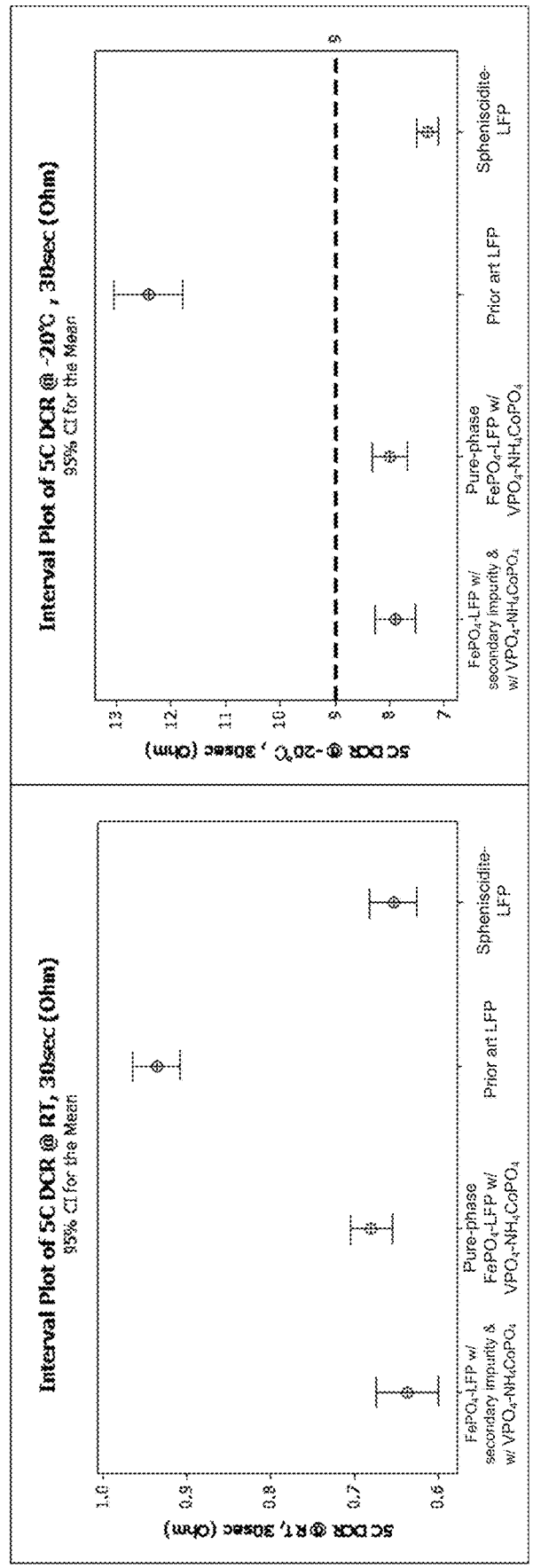
FIGS. 14A and 14B are interval plots of the various LFP samples described herein that compare the DCR, at room temperature and −20° C.

FIG. 14A shows an interval plot comparing the DCR of 20 mAh DLP cell at room temperature between a PP $FePO_4$-LFP with $VPO_4$—$NH_4CoPO_4$, an SP $FePO_4$-LFP (SP $FePO_4$-LFP) with $VPO_4$—$NH_4 CoPO_4$, a prior art $FePO_4$-LFP formulation, and a spheniscidite $FePO_4$-LFP. At room temperature, the PP $FePO_4$-LFP displays a DCR that may be comparable to that of spheniscidite $FePO_4$-LFP and the SP $FePO_4$-LFP. The DCR as shown in FIG. 14B also show that a PP $FePO_4$-LFP and the SP $FePO_4$-LFP including a secondary impurity phase have similar results to spheniscidite $FePO_4$-LFP at −20° C. Overall, the PP $FePO_4$-LFP displays lenience, stability and robustness with a performance comparable to that of spheniscidite $FePO_4$-LFP yet with the absence of $NH_3$ emissions during production, higher FCC, and with a more environmentally friendly dopant.

FIG. 15A displays the FCC of different samples of an SP $FePO_4$-LFP. FCC was measured at FIG. 15A, 10 C discharge capacity was measured at FIG. 15B, and surface area at FIG. 15C. Overall, the results showed good reproducibility. However, in some examples, the SP $FePO_4$-LFP may have need for moisture control during material processing.

FIG. 16A displays the FCC of different samples of a PP $FePO_4$-LFP. FCC was measured at FIG. 16A, 10 C discharge capacity was measured at FIG. 16B, and surface area at FIG. 16C. Overall, the results were comparable to those of the SP FePO$_4$-LFP. Furthermore, the results showed high consistency and reproducibility without the need for extra moisture control due at least in part to the PP FePO$_4$ having high moisture resistance which may make the synthesis process more controllable.

With respect to the SP FePO$_4$, in one example, the SP FePO$_4$ may include one or more impurities. For example, the impurities may correspond to phases of goethite (Fe$^{+3}$O(OH)) and iron phosphate (Fe(PO$_3$)$_3$). In contrast, PP FePO$_4$ has a diffraction pattern in which all peaks are well-defined and can be assigned to FePO$_4$.qH$_2$O where q is optimized. This diffraction pattern is indicative of high phase purity. In one example, the PP FePO$_4$ of this disclosure may have a moisture uptake of 3% or less even when exposed to high levels of atmospheric moisture for extended periods of time.

In order to achieve a high surface area LFP cathode with the indicated rate capability using the metrics described above, the iron phosphate precursor(s), dopant precursor(s), carbon source(s), and lithium source(s) may be thoroughly intermingled during the mixing, milling, and drying processes without phase separation on the microscopic level. Thus, a key teaching contained herein allows one skilled in the art to produce a dried powder containing the precursors described above that has a specific thermal profile, as measured using thermal gravimetric analysis (TGA) techniques, which, upon calcination, results in a final LFP powder with the desired physical, morphological, and electrochemical properties. This characterization technique is monitoring the mass of the dried powder and quantifying the change in mass as a function of the sample temperature. The profile resulting from this analysis provides insight into such things as decomposition patterns, degradation mechanisms, and reaction kinetics; all of which may occur at the optimal temperature and at the optimal rate to achieve an LFP powder with the desired characteristics.

As demonstrated by FIG. 17, there may be three key thermal zones that are monitored. The first zone occurs between 75° C. and 125° C. with the maximum peak height occurring at approximately 100° C. or within a range of 95° C. to 105° C., in another example. The peak occurring in this range may have the second largest peak height when normalized using the peak height from the signal collected in the second key thermal zone. The second zone may occur within a temperature ranging from 175° C. to 250° C. with the maximum peak height occurring at approximately 225° C.±25° C. The third temperature zone may occur between 275° C. and 425° C. and may contain a bi-modal peak in which the peak recorded at a lower temperature within the range may have a peak height that is more superior to that of the peak height associated with the peak recorded at a higher temperature within that same range in some cases. While two distinct peak heights may be observed, it is not necessary for the peaks to be completely de-convoluted as illustrated in FIG. 17. No substantial signal should be observed at temperatures above 500° C. in one example. It should also be noted that the rate at which the sample temperature is increased should be 10° C./min while other heating rates (5-10° C./min) can still be acceptable to use. A faster rate may result in peak overlap which makes it harder to distinguish the individual thermal zones.

Deviation from the thermal profile described herein can be attributed to phenomena such as aggregates of non-homogenous particles that will result in decomposition at different rates and temperatures, as a function of heat and mass transfer. Dried powders with less fully engaged ingredients will result in notably different decomposition kinetics which will result in different thermal profiles. It is important to note that a different thermal profile resulting from the conditions described above will not necessarily prevent the formation of LFP, but one that does not meet the desired physical and morphological properties as well as the needed electrochemical performance. Utilizing this technique, therefore, can enable real time material screening, to ensure more uniform mixing, milling, and spray drying processes.

The embodiments of the present disclosure focus on realizing an LFP with the appropriate chemical, physical, structural, and electrochemical properties that allow for facile rate performance over a wide range of temperatures while simultaneously achieving an FCC greater than 150 mAh/g. The chemical formulation for the LFP described herein may correspond to Li$_z$Fe$_{(1-x-y)}$V$_x$Co$_y$PO$_4$, where z≥1, 0.00≤x≤0.05, 0.00≤y≤0.01 and where the ranges and optimal values to achieve the desired result for x and y are described above. This system may demonstrate maximum chemical stability and electrochemical performance when the molar ratio of total non-Li metals to phosphate ratio approaches unity, where the total metals may be the sum of all the transition metals incorporated into the LFP (for example, Fe+V+Co). Further, in some examples, other metals, or combination of metals, may be used as a dopant. While unity is the optimal value for this metric, a range of 1.000 to 1.040:1 also results in the desired LFP properties and is utilized in the teachings herein. The main doping precursor used in this present disclosure is VPO$_4$ which has a similar chemical structure to FePO$_4$, especially when considering the anions of the two species are identical and therefore a higher doping efficiency when compared to other V doping precursors such as V$_2$O$_5$ and NH$_4$VO$_3$. It should be noted that this teaching is not limited to V, but all transition metal dopants considered. Another such example described herein is when co-doping the LFP with Co as the minority second dopant. In that system, it was also demonstrated that the phosphate based Co dopant may result in a more effective doping strategy when compared to other Co species such as the oxide form or cobalt oxalate. All of these ranges are acceptable and can result in an LFP with the desired physical properties and electrochemical performance.

When holistically utilizing the teaching of the present disclosure, in one example, the iron phosphate precursor as disclosed herein may: (1) result in zero NH$_3$ emission during LFP synthesis; (2) contain a Fe percentage by weight that approaches 37%, or ranges from 28 to 29.5% and 36 to 37% in other examples; (3) a P/Fe approaching unity with higher phase purity in order to alleviate the need for addition Fe and/or P sources; (4) a higher conversion efficiency from FePO$_4$ to LFP; (5) result in a significantly reduced moisture uptake in an ambient environment as demonstrated in FIG. 9; and (6) result in lower slurry viscosity during milling (due to low SSA) and enabling higher solids content thereby increasing throughput and production rate.

Turning to FIG. 18, an electrode assembly is illustrated which may include the disclosed LFP electrochemically active material. In a stackable cell configuration, multiple cathodes and anodes may be arranged as parallel alternating layers. In the example illustrated in FIG. 18, a stackable cell electrode assembly 1800 is shown. Electrode assembly 1800 is shown to include seven cathodes 1802a-1802g and six anodes 1804a-1804f. In one example, the cathodes may comprise the LFP synthesized from PP FePO$_4$ or an SP FePO$_4$ as described above. In another example, the cathodes may comprise the LFP synthesized from the above described FePO$_4$. Adjacent cathodes and anodes are separated by separator sheets 1806 to electrically insulate the adjacent electrodes while providing ionic communication between these electrodes. Each electrode may include a conductive substrate (e.g. metal foil) and one or two active material layers supported by the conductive substrate. Each negative active material layer is paired with one positive active material layer. In the example presented in FIG. 18, outer cathodes 1802a and 1802g include only one positive active material facing towards the center of assembly 1800. One having ordinary skill in the art would understand that any number of electrodes and pairing of electrodes may be used. Conductive tabs, such as tabs 1808, 1810 may be used to provide electronic communication between electrodes and conductive elements, for example.

Figure 19A:
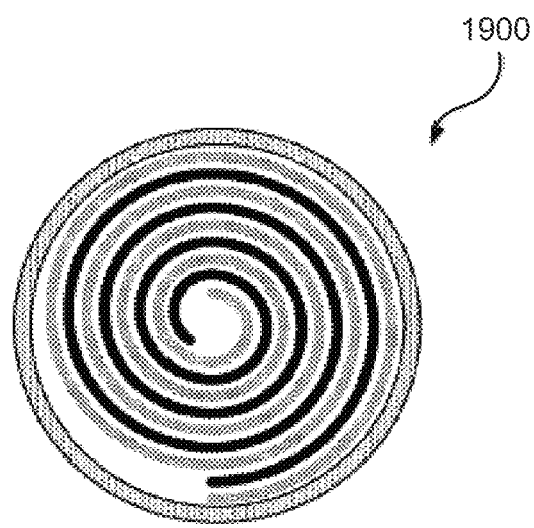
FIGS. 19A and 19B show a wound cell example.
Figure 19B:
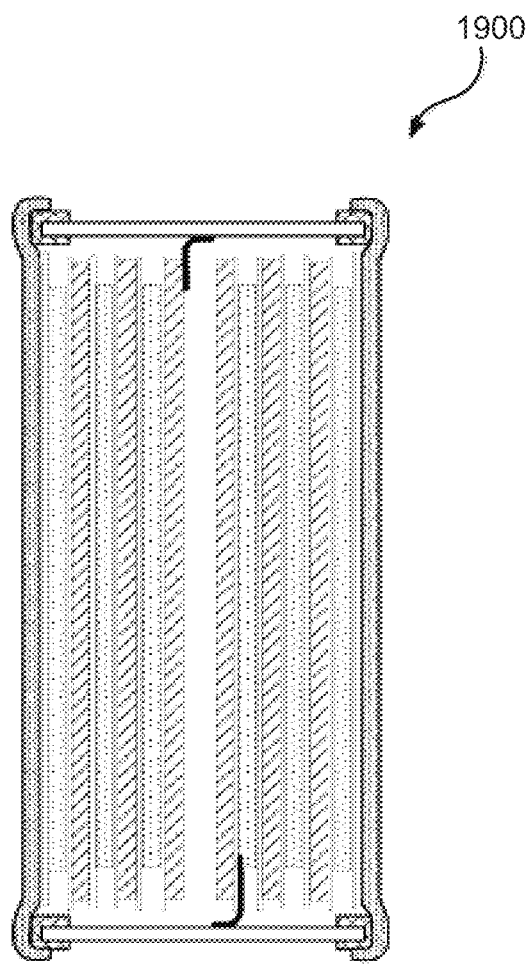

In FIGS. 19A and 19B, a wound cell example 1900 is illustrated in which two electrodes are wound into a jelly roll and housed within a container. The container housing the negative electrode, the positive electrode, the non-aqueous electrolyte and the separator.

The LFP synthesized from the above described FePO$_4$ as discussed in relation to Table III and method 1100 shows improved properties when used as an electrochemically active material in a battery. Thus, an electrochemical cell is disclosed, the electrochemical cell comprising a positive electrode with an active material layer comprising an LFP electrochemically active material doped with vanadium and cobalt and has a total non-lithium metal to phosphate molar ratio of 1.000-1.040:1, a negative electrode, an ionic electrolyte solution that supports the movement of ions back and forth between the positive and negative electrodes, and a porous separator.

The current disclosure improves upon prior LFP formulations by teaching key attributes associated with the precursor materials that result in the desired physical properties and electrochemical performance. These attributes are associated with the precursor crystal structure, chemical makeup (especially the anion), Fe content in the precursor and phase purity which can be identified through diffraction techniques and the P/Fe molar ratio of the iron phosphate precursor. Additional teachings are associated with how to manipulate the pore size and pore size distribution of the final LFP through precursor selection and processing. The enhanced crystalline pore network results in a lower moisture uptake at both the powder and electrode level. The LFP taught herein demonstrated less moisture uptake than the material proposed in U.S. patent application Ser. No. 14/641,172, for example. This may be due at least in part to the manipulation of the micro- and nanostructure of the PP FePO$_4$-LFP with smaller pore size diameters, which, in turn, may hinder the water uptake. The final LFP powder may provide more robust electrochemical performance and enhanced stability over time.

Various modifications of the present disclosure, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof.

The foregoing discussion should be understood as illustrative and should not be considered limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or steps plus function elements in the claims below are intended to include any structure, material or acts for performing the functions in combination with other claimed elements as specifically claimed.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A lithium iron phosphate electrochemically active material for use in an electrode in an electrochemical energy storage device, comprising:
   a phosphorus to iron molar ratio of 1.000-1.050:1;
   a dopant comprising vanadium and a co-dopant comprising cobalt; and
   a total non-lithium metal to phosphate molar ratio of 1.000-1.040:1,
   wherein the lithium iron phosphate electrochemically active material is in the form of primary and secondary particles having respective pore structures, such that the lithium iron phosphate electrochemically active material has a bimodal pore size distribution,
   wherein the bimodal pore size distribution has a first pore volume at a first pore width of about 2.5 nm, the first pore volume being larger than a pore volume of a lithium iron phosphate synthesized from a sphenisicidite precursor at the first pore width, and
   wherein the lithium iron phosphate electrochemically active material is not synthesized from the sphenisicidite precursor.

2. The lithium iron phosphate electrochemically active material of claim 1, wherein the lithium iron phosphate electrochemically active material corresponds to a formula of Li$_z$Fe$_{(1-x-y)}$V$_x$Co$_y$PO$_4$, where x is greater than 0, y is greater than 0, and z is greater than or equal to 1.

3. The lithium iron phosphate electrochemically active material of claim 1, wherein the vanadium is contributed by a first oxyanion species for which the vanadium is considered a cation, and where the cobalt is contributed by a second oxyanion species for which the cobalt is considered a cation.

4. The lithium iron phosphate electrochemically active material of claim 1, wherein the vanadium is contributed by an oxyanion species, where the oxyanion species is vanadium phosphate (VPO$_4$), ammonium metavanadate (NH$_4$VO$_3$), or a combination of the two, and where the vanadium dopant is in a trivalent state.

5. The lithium iron phosphate electrochemically active material of claim 1, wherein the lithium iron phosphate electrochemically active material comprises a surface area of 25 to 35 m$^2$/g.

6. The lithium iron phosphate electrochemically active material of claim 5, wherein the surface area is contributed by the primary and secondary particles with the respective pore structures.

7. The lithium iron phosphate electrochemically active material of claim 6, wherein a particle diameter of the primary particles is between 25 and 150 nm.

8. The lithium iron phosphate electrochemically active material of claim 6, wherein a particle diameter of the primary particles is less than 80 nm.

9. The lithium iron phosphate electrochemically active material of claim 6, wherein greater than 50% of a pore volume of the pore structures is attributed to pores less than 15 nm in diameter.

10. The lithium iron phosphate electrochemically active material of claim 1, wherein the total non-lithium metal to phosphate molar ratio is 1.001-1.020:1.

11. The lithium iron phosphate electrochemically active material of claim 1, wherein the lithium iron phosphate electrochemically active material is synthesized from a pure-phase $FePO_4$ precursor.

12. The lithium iron phosphate electrochemically active material of claim 1, wherein a moisture uptake of the lithium iron phosphate electrochemically active material is lower than a moisture uptake of the lithium iron phosphate synthesized from the spheniscidite precursor.

13. The lithium iron phosphate electrochemically active material of claim 1, wherein the first pore volume is about 0.003-0.004 $cm^3/(g \cdot nm)$.

14. The lithium iron phosphate electrochemically active material of claim 1, wherein the bimodal pore size distribution has a second pore volume at a second pore width of about 20 nm, the second pore volume being smaller than a pore volume of the lithium iron phosphate synthesized from the spheniscidite precursor at the second pore width.

15. The lithium iron phosphate electrochemically active material of claim 14, wherein the second pore volume is less than about 0.001 $cm^3/(g \cdot nm)$.

* * * * *